US012634088B2

(12) United States Patent
Horn et al.

(10) Patent No.: US 12,634,088 B2
(45) Date of Patent: May 19, 2026

(54) PHYSICAL LAYER TCI CONFIGURATION

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 18/150,163

(22) Filed: Jan. 4, 2023

(65) Prior Publication Data

US 2024/0223337 A1 Jul. 4, 2024

(51) Int. Cl.
H04L 5/00 (2006.01)

(52) U.S. Cl.
CPC ............ H04L 5/0053 (2013.01); H04L 5/006 (2013.01)

(58) Field of Classification Search
CPC ..... H04L 5/0053; H04L 5/006; H04L 5/0007; H04L 5/001; H04L 5/0094; H04L 5/0023; H04B 7/0695
See application file for complete search history.

(56) References Cited

U.S. PATENT DOCUMENTS

2020/0100225 A1 3/2020 Khoshnevisan et al.
2020/0329395 A1* 10/2020 Pezeshki ................ H04B 7/088

2021/0036817 A1    2/2021  Bai et al.
2022/0022048 A1*   1/2022  Si ........................... H04W 16/14
2022/0263616 A1*   8/2022  Farag .................... H04L 5/0048
2022/0338235 A1*  10/2022  Bagheri ................ H04L 5/0094
2024/0244614 A1*   7/2024  Matsumura ........... H04L 5/0023

FOREIGN PATENT DOCUMENTS

WO        2021212259 A1   10/2021

OTHER PUBLICATIONS

International Search Report and Written Opinion—PCT/US2023/084127—ISA/EPO—Apr. 10, 2024.

* cited by examiner

*Primary Examiner* — Ian N Moore
*Assistant Examiner* — Latresa A Mccallum
(74) *Attorney, Agent, or Firm* — QUALCOMM Incorporated

(57) ABSTRACT

Aspects presented herein may enable a UE to be configured with various types of physical layer TCI configurations based on beam(s), carrier-frequencies, cells, and/or channels used by the UE for communication. In one aspect, a UE receives, from a network entity, an indication of a set of physical layer configurations that is capable of being signaled by a TCI, where the set of physical layer configurations is associated with a set of TCI configurations. The UE receives, from the network entity, the set of TCI configurations associated with the set of physical layer configurations based on the indication, where the set of TCI configurations is associated with a set of beams, a set of carrier frequencies, a set of cells, a set of channels, or a combination thereof.

24 Claims, 12 Drawing Sheets

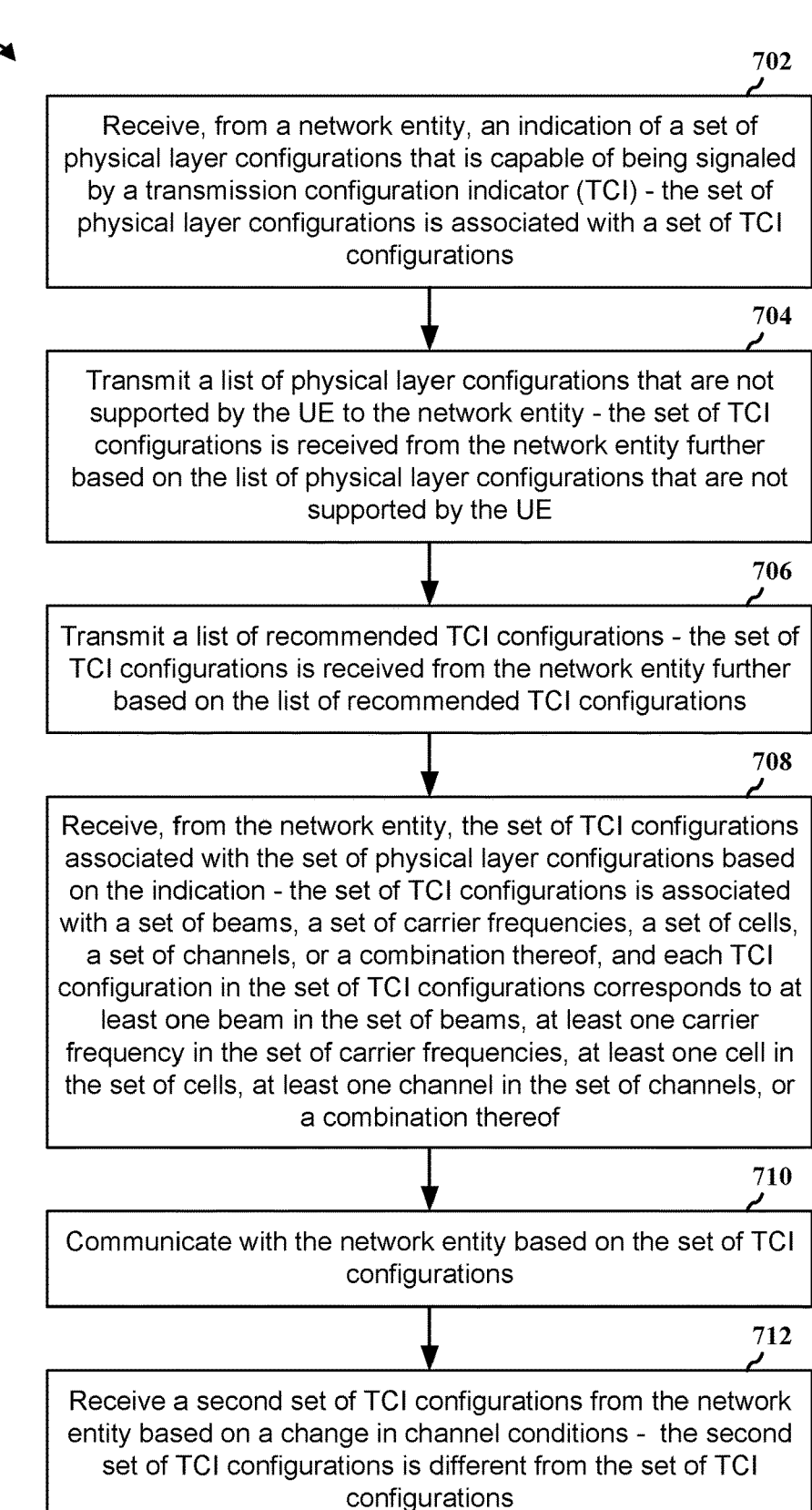

700

702

Receive, from a network entity, an indication of a set of physical layer configurations that is capable of being signaled by a transmission configuration indicator (TCI) - the set of physical layer configurations is associated with a set of TCI configurations

704

Transmit a list of physical layer configurations that are not supported by the UE to the network entity - the set of TCI configurations is received from the network entity further based on the list of physical layer configurations that are not supported by the UE

706

Transmit a list of recommended TCI configurations - the set of TCI configurations is received from the network entity further based on the list of recommended TCI configurations

708

Receive, from the network entity, the set of TCI configurations associated with the set of physical layer configurations based on the indication - the set of TCI configurations is associated with a set of beams, a set of carrier frequencies, a set of cells, a set of channels, or a combination thereof, and each TCI configuration in the set of TCI configurations corresponds to at least one beam in the set of beams, at least one carrier frequency in the set of carrier frequencies, at least one cell in the set of cells, at least one channel in the set of channels, or a combination thereof

710

Communicate with the network entity based on the set of TCI configurations

712

Receive a second set of TCI configurations from the network entity based on a change in channel conditions - the second set of TCI configurations is different from the set of TCI configurations

FIG. 7

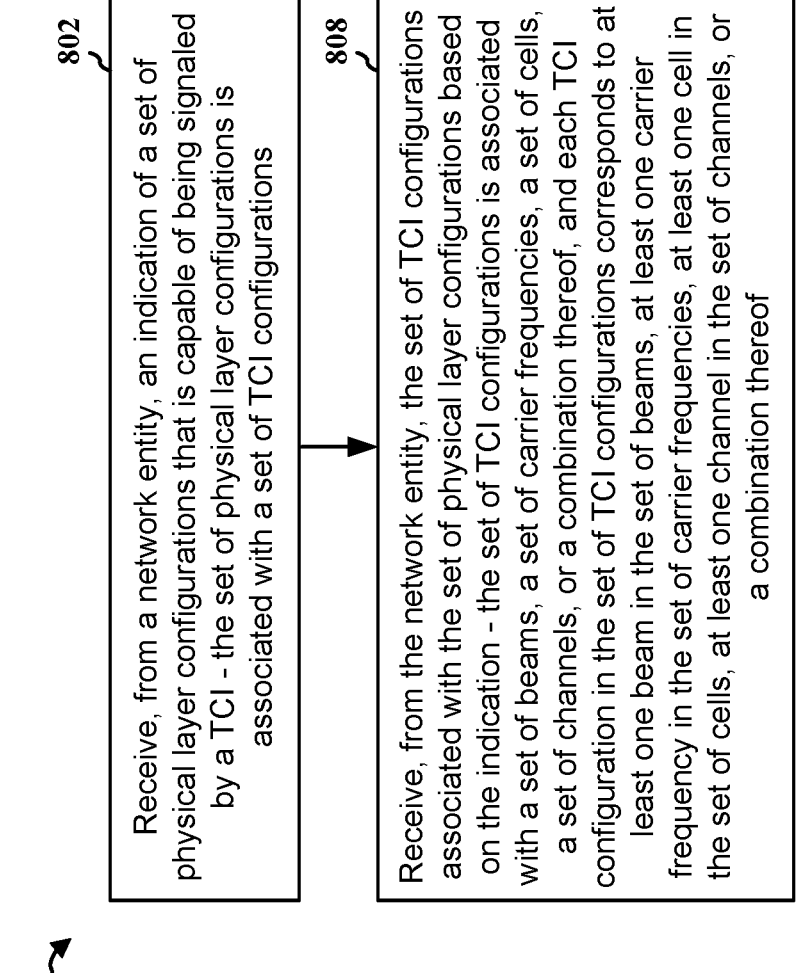

802

Receive, from a network entity, an indication of a set of physical layer configurations that is capable of being signaled by a TCI - the set of physical layer configurations is associated with a set of TCI configurations

808

Receive, from the network entity, the set of TCI configurations associated with the set of physical layer configurations based on the indication - the set of TCI configurations is associated with a set of beams, a set of carrier frequencies, a set of cells, a set of channels, or a combination thereof, and each TCI configuration in the set of TCI configurations corresponds to at least one beam in the set of beams, at least one carrier frequency in the set of carrier frequencies, at least one cell in the set of cells, at least one channel in the set of channels, or a combination thereof

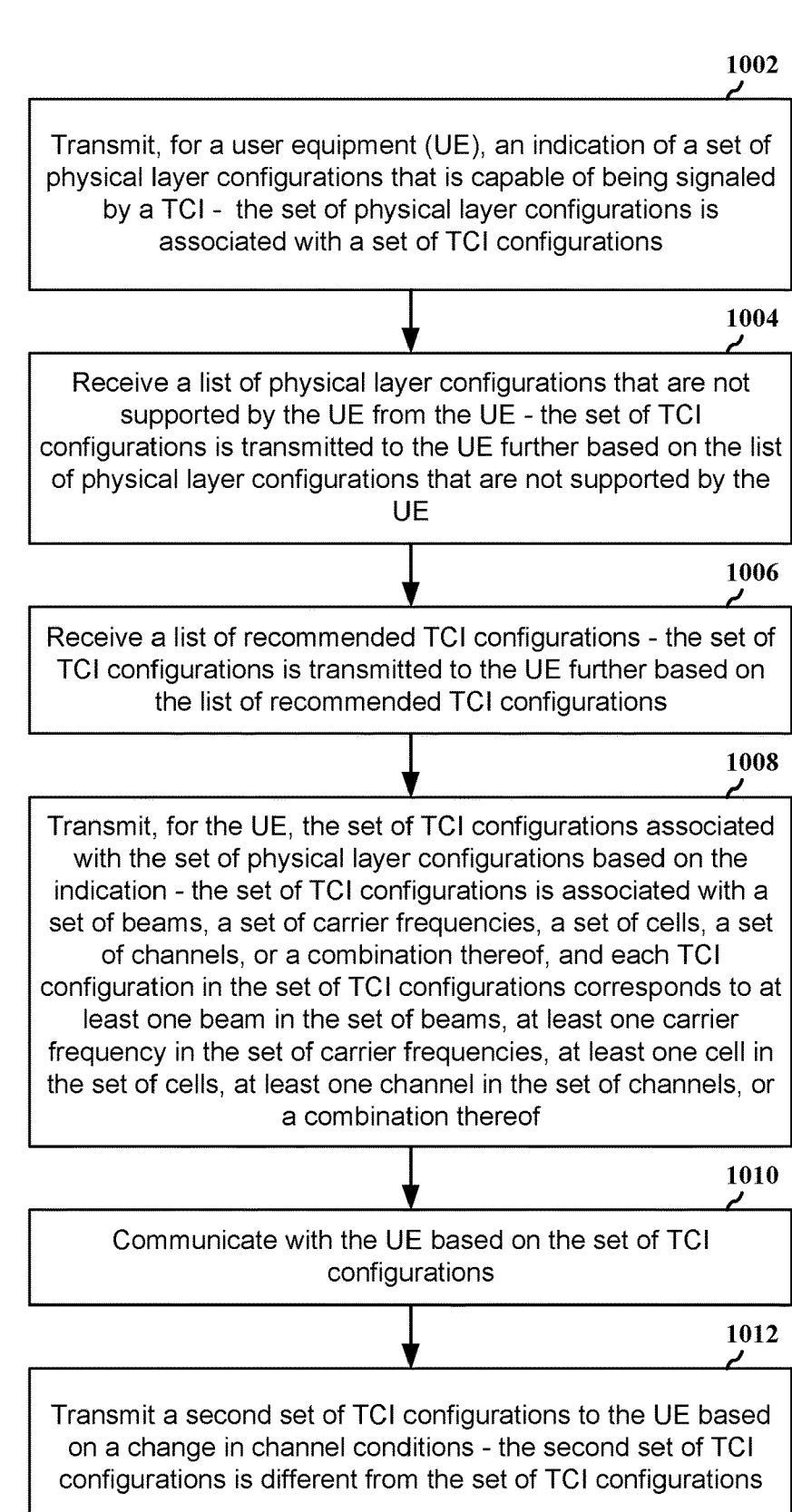

1002

Transmit, for a user equipment (UE), an indication of a set of physical layer configurations that is capable of being signaled by a TCI - the set of physical layer configurations is associated with a set of TCI configurations

1004

Receive a list of physical layer configurations that are not supported by the UE from the UE - the set of TCI configurations is transmitted to the UE further based on the list of physical layer configurations that are not supported by the UE

1006

Receive a list of recommended TCI configurations - the set of TCI configurations is transmitted to the UE further based on the list of recommended TCI configurations

1008

Transmit, for the UE, the set of TCI configurations associated with the set of physical layer configurations based on the indication - the set of TCI configurations is associated with a set of beams, a set of carrier frequencies, a set of cells, a set of channels, or a combination thereof, and each TCI configuration in the set of TCI configurations corresponds to at least one beam in the set of beams, at least one carrier frequency in the set of carrier frequencies, at least one cell in the set of cells, at least one channel in the set of channels, or a combination thereof

1010

Communicate with the UE based on the set of TCI configurations

1012

Transmit a second set of TCI configurations to the UE based on a change in channel conditions - the second set of TCI configurations is different from the set of TCI configurations

FIG. 10

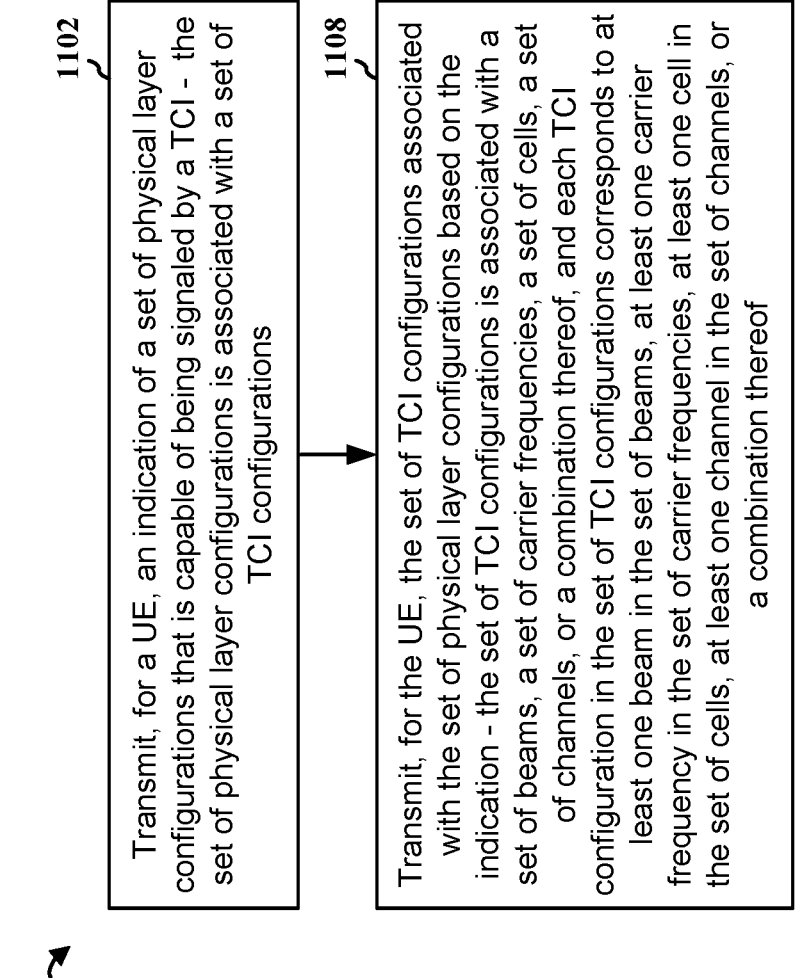

1102

Transmit, for a UE, an indication of a set of physical layer configurations that is capable of being signaled by a TCI - the set of physical layer configurations is associated with a set of TCI configurations

1108

Transmit, for the UE, the set of TCI configurations associated with the set of physical layer configurations based on the indication - the set of TCI configurations is associated with a set of beams, a set of carrier frequencies, a set of cells, a set of channels, or a combination thereof, and each TCI configuration in the set of TCI configurations corresponds to at least one beam in the set of beams, at least one carrier frequency in the set of carrier frequencies, at least one cell in the set of cells, at least one channel in the set of channels, or a combination thereof

PHYSICAL LAYER TCI CONFIGURATION

TECHNICAL FIELD

The present disclosure relates generally to communication systems, and more particularly, to a wireless communication involving physical layer transmission configuration indicator (TCI) configuration.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a network entity, an indication of a set of physical layer configurations that is capable of being signaled by a transmission configuration indicator (TCI), where the set of physical layer configurations is associated with a set of TCI configurations. The apparatus receives, from the network entity, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

In an aspect of the disclosure, a method, a computer-readable medium, and an apparatus are provided. The apparatus transmits, for a user equipment (UE), an indication of a set of physical layer configurations that is capable of being signaled by a TCI, where the set of physical layer configurations is associated with a set of TCI configurations. The apparatus transmits, for the UE, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart of a method of wireless communication.

FIG. 8 is a flowchart of a method of wireless communication.

FIG. 10 is a flowchart of a method of wireless communication.

FIG. 11 is a flowchart of a method of wireless communication.

DETAILED DESCRIPTION

Figure 1:
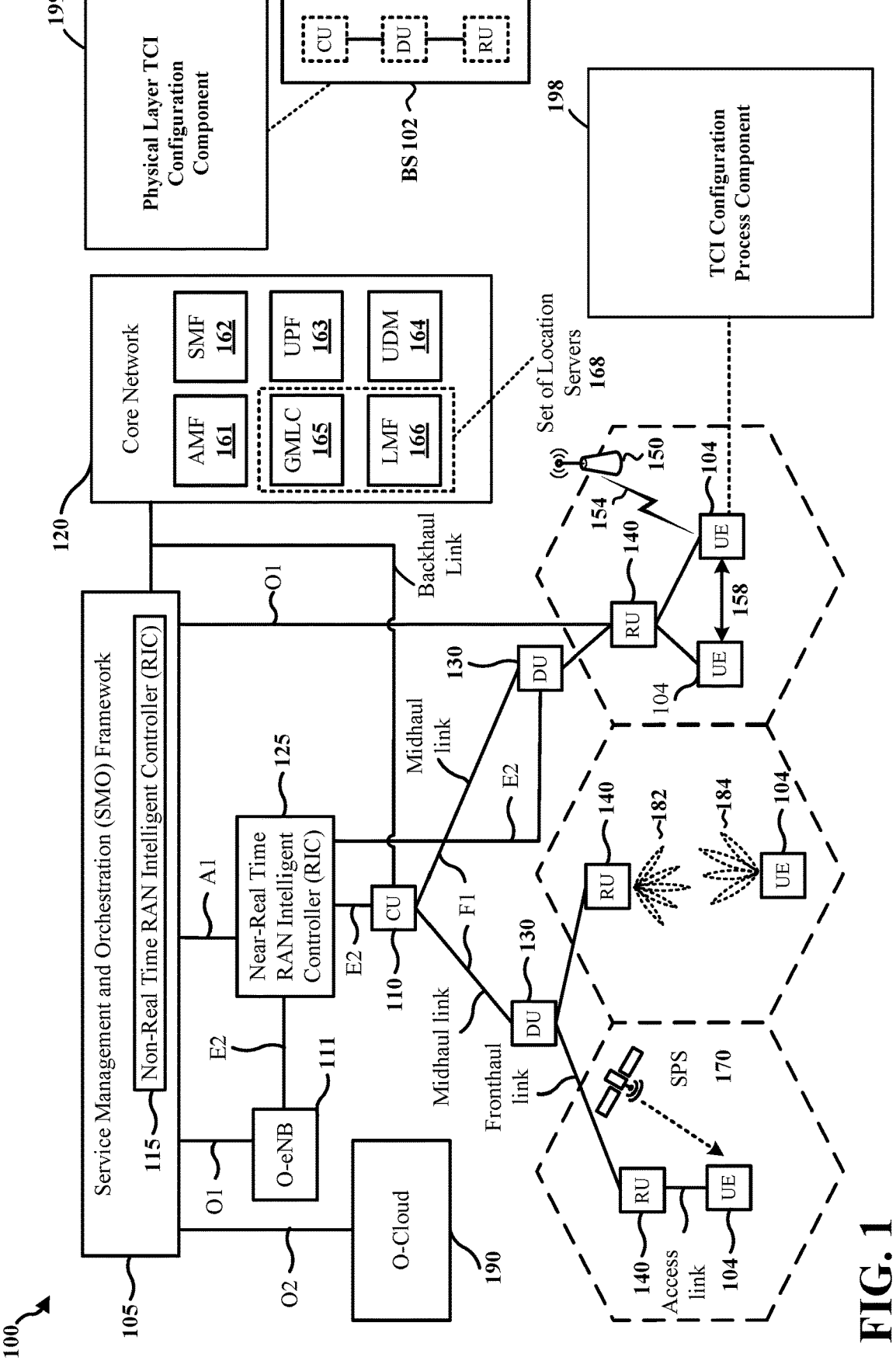
FIG. 1 is a diagram illustrating an example of a wireless communications system and an access network.

Aspects presented herein may improve the power consumption and spectral efficiency for wireless devices communicating at higher frequency bands. Aspects presented herein may enable a network entity to configure a UE with various types of waveforms based on one or more conditions. For example, as some of the beams (e.g., transmission (Tx) beams and/or reception (Rx) beams of a wireless device) may have similar/same optimal physical layer configuration, a physical layer transmission configuration indicator (TCI) may be configured to provide a waveform configuration for each beam, carrier-frequency, cell, and/or channel. In some examples, a waveform configuration may be common/applied for multiple beams, carrier-frequencies, cells, and/or channels based on the network implementation. In one aspect, by enabling a network entity (e.g., a base station) to configure physical layer TCI per beam, carrier-frequency, cell, and/or channel, link/channel optimization with faster signaling and low report overhead may be achieved. For example, a change in the configuration may be signaled to a wireless device (e.g., a UE) with a change in the TCI based on a defined configuration used on a different beam). Also, common beam, carrier-frequency, waveform, and/or channel configuration(s) may further reduce a configuration payload overhead. In another aspect, a UE may report suitable/desired beams to a network entity to request same waveform configuration(s) for these beams for power efficiency optimization (as the network entity may not be aware of the UE's power consumption).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE

104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a TCI configuration process component 198 that may be configured to receive, from a network entity, an indication of a set of physical layer configurations that is capable of being signaled by a TCI, where the set of physical layer configurations is associated with a set of TCI configurations; and receive, from the network entity, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

In certain aspects, the base station 102 may have a physical layer TCI configuration component 199 that may be configured to transmit, for a UE, an indication of a set of physical layer configurations that is capable of being signaled by a TCI, where the set of physical layer configurations is associated with a set of TCI configurations; and transmit, for the UE, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

Figures 2A, 2B, 2C, 2D:
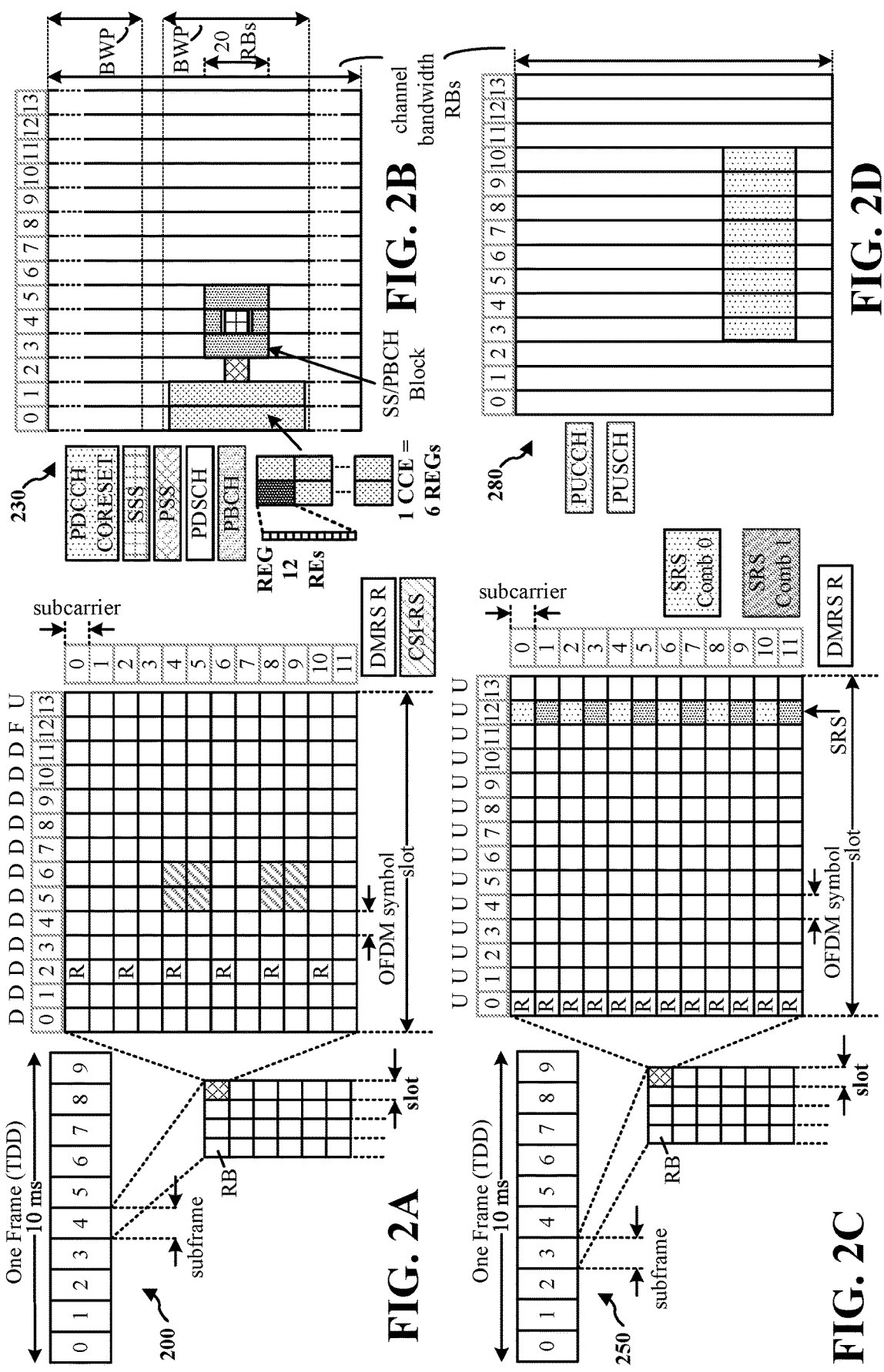
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
|---|---|---|
| μ | SCS $\Delta f = 2^\mu \cdot 15$[kHz] | Cyclic prefix |
| 0 | 15 | Normal |
| 1 | 30 | Normal |

TABLE 1-continued

| | Numerology, SCS, and CP | |
|---|---|---|
| μ | SCS $\Delta f = 2^\mu \cdot 15$[kHz] | Cyclic prefix |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
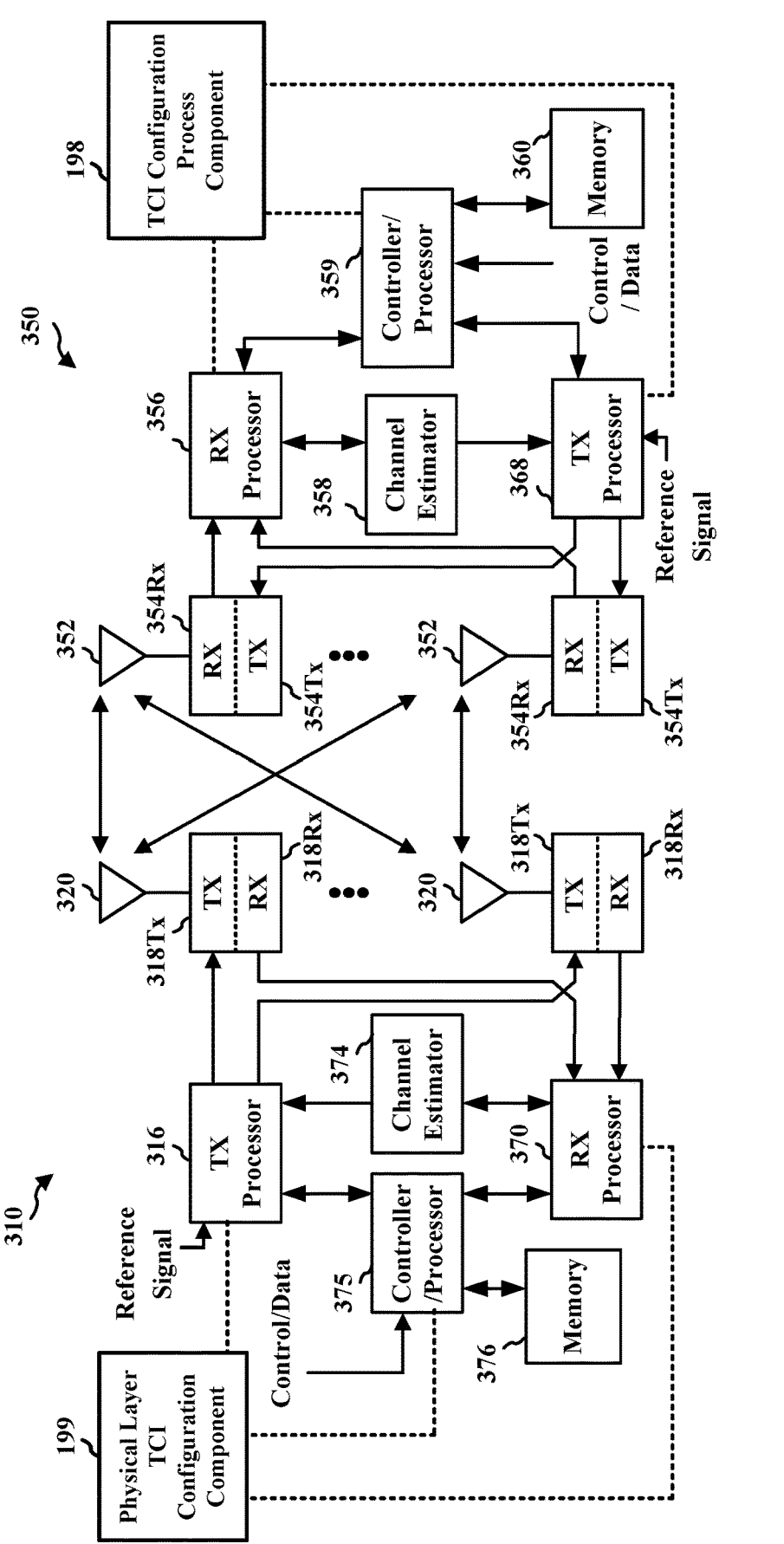
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TCI configuration process component 198 of FIG. 1.

At least one of the TX processor 316, the RX processor 370, and the controller/processor 375 may be configured to perform aspects in connection with the physical layer TCI configuration component 199 of FIG. 1.

With an increasing demand for faster data transmission, future generations of wireless communication have aimed to provide higher data rates, improved energy efficiency, and lower latency, etc. To achieve this goal, larger antenna arrays and signaling in the high-frequency spectra (e.g., millimeter wave (mmW or mmWave) and sub-terahertz (THz) bands) are expected to be widely used by network providers, where larger antenna arrays may improve spectral efficiency and high-frequency bands may provide more available bandwidth. On the other hand, with the use of higher frequency bands and larger data rates, the power consumption of a user equipment (UE) (e.g., a mobile phone, a laptop, a tablet, etc.) is also expected to increase. As such, one of the challenges in future generations of wireless communication is reducing the power consumption of the UE. This challenge may continue to exist and become more prominent with the growth in frequency and bandwidth.

For example, as wireless communication moves to higher frequency bands, such as sub-THz bands, the antenna dimensions may decrease (e.g., the size of an antenna may be relative to the wavelength it is specified to generate). As such, more antennas or antenna elements may be supported/included in an antenna array for the same antenna array size. With increased number of antennas or antenna elements, a wireless device may be capable of generating higher array gains and narrower beams. In some scenarios, the combination of narrower beam width and higher path loss may decrease the number of scatters received, which may consequently lead the communication channels to have a near flat frequency domain response.

Figure 4:
FIG. 4 is a diagram illustrating example signals that may be received/observed by a receiving device from a narrow beam transmission within the sub-terahertz (THz) frequency range in accordance with various aspects of the present disclosure.

FIG. 4 is a diagram 400 illustrating example signals 402, 404 and 406 that may be received/observed by a receiving device from a narrow beam transmission within the sub-THz frequency range, where signals 402, 404 and 406 may have a smooth curve without a notch and/or a peak (e.g., appears to be "near flat" in frequency domain), e.g., the signals 402, 404 and 406 may fluctuate once or has no fluctuation when it is received by the receiving device. Thus, when a transmitted signal reaches a receiver with an attenuation and a delay and without distortion, the signal may be equalized or received with an equalizer having a single delay element or few delay elements. In some examples, an equalizer with a single delay element and/or a receiver receiving a signal from a single path may be referred to as a "single tap receiver" or a "single tap equalizer."

The near flat frequency domain response may make various waveforms more attractive or suitable than orthogonal frequency-division multiplexing (OFDM) waveform, which have been used by various wireless communication networks over last few years. For example, power efficient waveforms such as single carrier (SC) waveform, discrete Fourier transform (DFT) spread OFDM (DFT-s-OFDM) waveform, and/or code-division multiple access (CDMA) waveform, etc., may be good waveform candidates for higher frequency bands (e.g., for the FR2 and above bands). One advantage of the DFT-s-OFDM waveform is its ability to equalize the channel in the frequency domain compared to the SC waveform which performs the equalization in the time domain. In a dispersive channel, the DFT-s-OFDM waveform may also have the advantage in means of performance and efficiency, whereas in a flat channel, the SC waveform may achieve similar performance and with lower design/implementation complexity. On the other hand, an advantage of the OFDM waveform compared to the DFT-s-OFDM waveform is its ability to demodulate the data in a maximum likelihood approach and in a nonlinear manner, which may improve its performance compared to the DFT-s-OFDM waveform in some channel conditions. As such, for each beam, carrier-frequency, and/or channel, one type of waveform may be more suitable or optimal than other types of waveforms in means of performance, coverage, and power efficiency.

Aspects presented herein may improve the power consumption and spectral efficiency for wireless devices communicating at higher frequency bands. Aspects presented herein may enable a network entity to configure a UE with various types of waveforms based on one or more conditions. For example, as some of the beams (e.g., transmission (Tx) beams and/or reception (Rx) beams of a wireless device) may have similar/same optimal physical layer configuration, a physical layer transmission configuration indicator (TCI) may be configured to provide a waveform configuration for each beam, carrier-frequency, cell, and/or channel. In some examples, a waveform configuration may be common/applied for multiple beams, carrier-frequencies, cells, and/or channels based on the network implementation. In one aspect, by enabling a network entity (e.g., a base station) to configure physical layer TCI per beam, carrier-frequency, and/or channel, link/channel optimization with faster signaling and low report overhead may be achieved. For example, a change in the configuration may be signaled to a wireless device (e.g., a UE) with a change in the TCI based on a defined configuration used on a different beam). Also, common beam, carrier-frequency, waveform, and/or channel configuration(s) may further reduce a configuration payload overhead. In another aspect, a UE may report suitable/desired beams to a network entity to request same waveform configuration(s) for these beams for power efficiency optimization (as the network entity may not be aware of the UE's power consumption).

Figure 5:
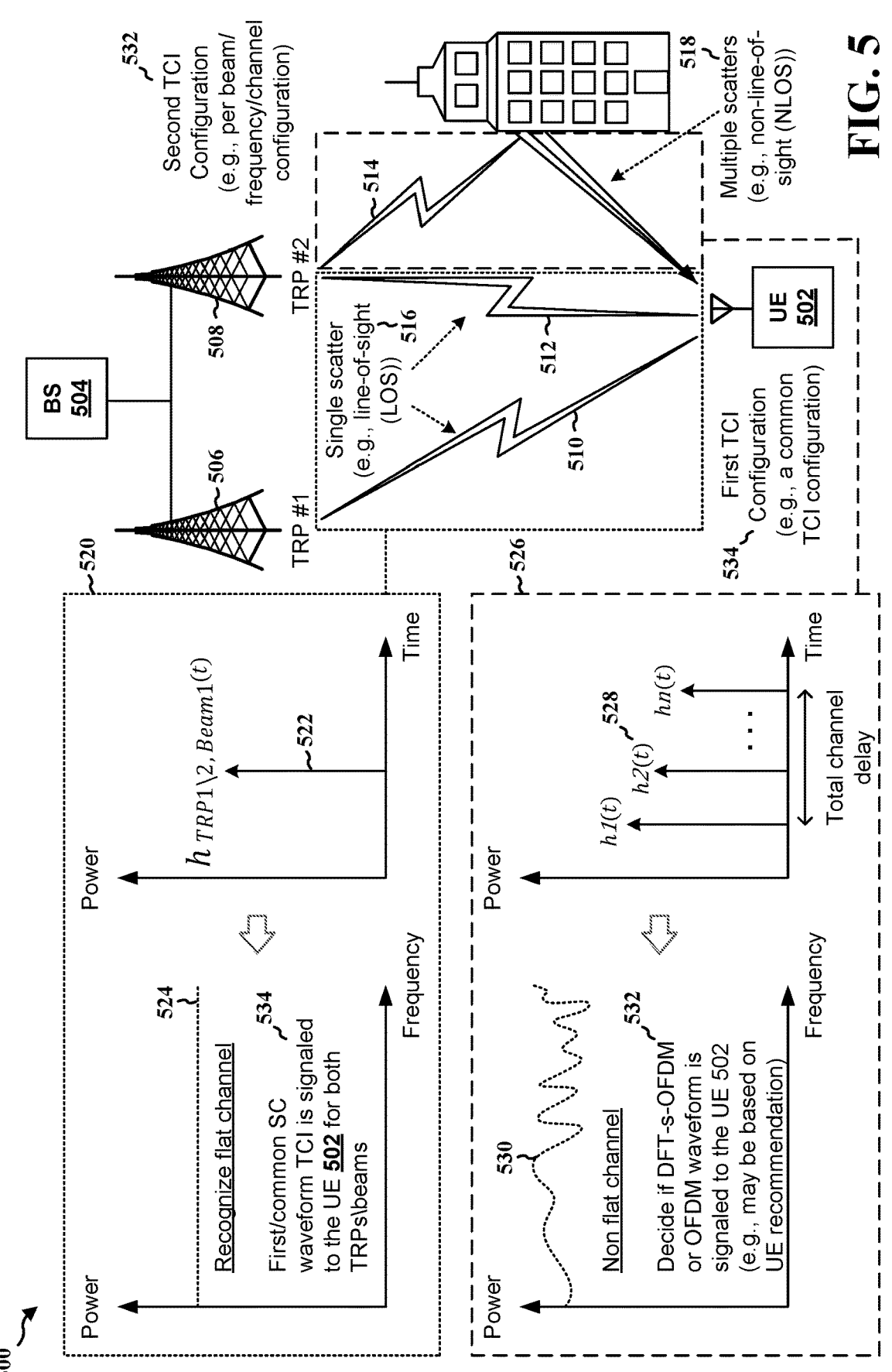
FIG. 5 is a diagram illustrating an example of a network entity configuring multiple waveform configurations for a UE in accordance with various aspects of the present disclosure.

FIG. 5 is a diagram 500 illustrating an example of a network entity configuring multiple waveform configurations for a UE in accordance with various aspects of the present disclosure. A UE 502 may be communicating (e.g., transmitting and/or receiving data/control signals, etc.) with a base station 504 (e.g., a network entity) via a first TRP 506 (TRP #1) and a second TRP 508 (TRP #2) of the base station 504. In addition, the first TRP 506 may be communicating with the UE 502 using a first beam 510 of the first TRP 506 (TRP1,Beam1), and the second TRP 508 may be communicating with the UE 502 using a first beam 512 of the second TRP 508 (TRP2, Beam1) and a second beam 514 of the second TRP 508 (TRP2,Beam2).

In one example, as shown at 516, the communication between the UE 502 and the first TRP 506 and the second TRP 508 via the first beam 510 of the first TRP 506 and the first beam 512 of the second TRP 508 may have a single scatter, such as based on a line-of-sight (LOS) condition. LOS may refer to a direct line/path between a first wireless device (e.g., the first TRP 506, the second TRP 508, etc.) and a second wireless device (e.g., the UE 502), where the first wireless device and the second wireless device may be in view of each other without an obstacle between the wireless devices. On the other hand, as shown at 518, the communication between the UE 502 and the second TRP 508 via the second beam 514 of the second TRP 508 may have multiple scatters, such as based on a non-line-of-sight (NLOS) condition. NLOS may refer to a non-direct line/path between a first wireless device and a second wireless device, where the first wireless and the second wireless device may be in view of each other, or there are one or more obstacles between the wireless devices. For example, the signal transmitted from the first wireless device may bounce off from a building and/or penetrate through a medium before reaching the second wireless device.

As shown at 520, when a transmission (e.g., a beam) is based on the LOS condition (e.g., the first beam 510 of the first TRP 506, the first beam 512 of the second TRP 508, etc.), the UE 502 may receive the transmission via a single tap, which may be recognized by the UE 502 as a flat channel (e.g., in frequency domain). For example, the transmission received by the UE 502 via the first beam 510 of the first TRP 506 at a given time (t) may be represented by $h_{TRP1,Beam1} = A_{TRP1,Beam1} \delta(t - \tau T_{RP1,Beam1})$, which may be a single tap as shown at 522. Similarly, the transmission received by the UE 502 via the first beam 512 of the second TRP 508 at the given time (t) may be represented by $h_{TRP2,Beam1} = A_{TRP2,Beam1} \delta(t - \tau_{TRP2,Beam1})$, which may also be represented by the single tap shown at 522 (e.g., $h_{TRP1\backslash2,Beam1}(t)$). As shown at 524, this single tap may correspond to a flat channel.

When a transmitted signal (e.g., the signals 402, 404, and 406) reaches a receiver (e.g., the UE 502) with an attenuation and a delay and without distortion, the signal may be equalized or received with an equalizer having a single delay element or few delay elements. In some examples, an equalizer with a single delay element and/or a receiver receiving a signal from a single path may be referred to as a "single tap receiver" or a "single tap equalizer." In other words, a single tap receiver may be used for a channel that introduces a delay and an attenuation to the transmitted signal without being frequency selective. A channel that introduces a delay and an attenuation to the transmitted signal may also be referred to as a "single tap channel," and the single tap channel may be a flat channel over time domain. Thus, a transmission using a narrow beam (e.g., using a higher frequency band) may have the capability to provide a single tap channel or few tap channels with a small delay spread (e.g., on the order of a few nanoseconds) as the signal may reach the receiver with little to no distortions. As the single tap receiver may have less components and use lower complexity algorithm to equalize the received signal, the single tap receiver may be relatively cheaper to manufacture and implement compared to the high complexity equalizers. Thus, according to one or more examples, if wireless devices are able to communicate in a single tap channel, the wireless devices may use single tap receivers to receive the signals, which may reduce the cost, power, and/or the die size for the receivers of the wireless devices.

On the other hand, as shown at 526, when a transmission (e.g., a beam) is based on the NLOS condition (e.g., the second beam 514 of the second TRP 508), the UE 502 may receive the transmission via multiple taps due to channel delay, e.g., signals bounced off from a building may reach the UE 502 at different times (e.g., h1(t), h2(t) . . . hn(t), etc.) as shown at 528. Thus, the transmission received by the UE 502 via the second beam 514 of the second TRP 508 at the given time (t) may be represented by $$h_{TRP2,Beam2} = \sum_i^{Ntaps} A^i_{TRP2,Beam2} \delta\left(t - \tau^i_{TRP2,Beam1}\right),$$

which may correspond to a non-flat channel as shown at 530. In some examples, a higher complexity receiver may be specified by the UE 502 for equalizing signals in the non-flat channel (e.g., reversing the distortion incurred by signals during transmission), which may increase power consumption at the UE 502 compared to the single tap receiver.

In some scenarios, as different channel conditions (e.g., LOS condition, NLOS condition, etc.) may be suitable for different waveforms, power consumption and spectral efficiency at a UE may not be optimized/minimized if the UE is configured to use the same waveform for different channel conditions. For example, the single carrier (SC) waveform may be more suitable the LOS communication, whereas the OFDM waveform may be more suitable for NLOS communication. However, if a UE is configured to use the OFDM waveform while communicating under the LOS condition at high frequency bands (e.g., as shown by FIG. 4), a more complex and power consuming receiver may be specified by the UE (compared to a single tap receiver).

As such, in one aspect of the present disclosure, at the connection establishment (e.g., when the UE 502 is connecting to the base station 504), the base station 504 may signal to the UE 502 a set of supported physical layer configurations that is capable of being signaled by TCI. For example, the set of supported physical layer configurations that is capable of being signaled by TCI may include: applicable waveform(s) (e.g., OFDM waveform, DFT-s-OFDM waveform, SC waveform, CDMA waveform, etc.), constellation(s) (e.g., quadrature amplitude modulation (QAM), non-square QAM, amplitude and phase-shift keying (APSK), etc.), modulation method(s) (e.g., multi-level coding, bit interleaved coded modulation (BICM), on-off keying (OOK), etc.), code block group (CBG) size(s) (e.g., 1, 2, 4, 8, bits, etc.), code block (CB) mapping method(s) (e.g., time domain, frequency domain, layer domain, etc.), coding method(s) (e.g., low-density parity-check (LDPC) coding. Bose-Chaudhuri-Hocquenghem (BCH) coding/ multi-level BCH coding, Reed-Solomon coding (low power), turbo coding, etc.), and/or resource allocation (e.g., a first TCI may be configured for a first range of resource allocation size (e.g., between 50-100 resources blocks (RBs) and a second TCI may be configured for a second range of resource allocation size (e.g., between 0-50 RBs)), etc. In some examples, the UE 502 may report configuration(s) that are not support by the UE 502 (e.g., not supported by the hardware (HW) of the UE 502) to the base station 504, such that the base station 504 may configure the UE 502 based on the report.

After the UE 502 is in a connected mode, the base station 504 may signal to the UE 502 a TCI configuration for each beam, each carrier-frequency (e.g., for carrier aggregation CA)), each cell (e.g., a primary cell or a secondary cell, a handover (HO) cell, etc.), and/or each channel, etc., used by the UE for communication. The channel may include physical downlink control channel (PDCCH), physical downlink shared channel (PDSCH), physical uplink control channel (PUCCH), physical uplink shared channel (PUSCH), physical sidelink shared channel (PSSCH), physical sidelink control channel (PSCCH), synchronization signal block (SSB), channel state information reference signal (CSI-RS), sounding reference signal (SRS), phase tracking reference signal (PTRS), demodulation reference signal (DMRS), and/or Tracking reference signals (TRS), etc. For example, as shown at 532, for the second beam 514 of the second TRP 508 that is communicating with the UE 502 under an NLOS condition, the base station 504 may provide a physical layer TCI configuration that is specified for the second beam 514 of the second TRP 508, such as using an OFDM waveform with a specified constellation, modulation method, CBG size, CB mapping method, and/or coding method, etc.

In some examples, if multiple component carriers (CCs) or beams are activated together, a common TCI configuration may be used for the multiple CCs/beams. For example, as shown at 524, if the first beam 510 of the first TRP 506 and the first beam 512 of the second TRP 508 are being activated at the same time, the base station 504 may use one TCI configuration (e.g., a common TCI configuration) to configure both beams, such as configuring the UE 502 to use an SC waveform with a specified constellation, modulation method, CBG size, CB mapping method, and/or coding method, etc. The UE 502 may send a recommendation of preferred/suitable/desired configuration based on a specific beam via a report (e.g., via a channel state information feedback (CSF) report), which may be based on the TCI configuration or based on a new configuration. The TCI configuration may be changed according to the channel conditions, and the base station 504 may signal the updated/ new TCI configuration to the UE 502 via a medium access control (MAC)-control element (CE) (MAC-CE), a radio resource control (RRC) message, or downlink control information (DCI), etc. If multiple UEs are served by a same beam (e.g., the first beam 510 of the first TRP 506, the first beam 512 of the second TRP 508, etc.), the base station 504 may also broadcast the TCI configuration associated with this beam to the multiple UEs.

Figure 6:
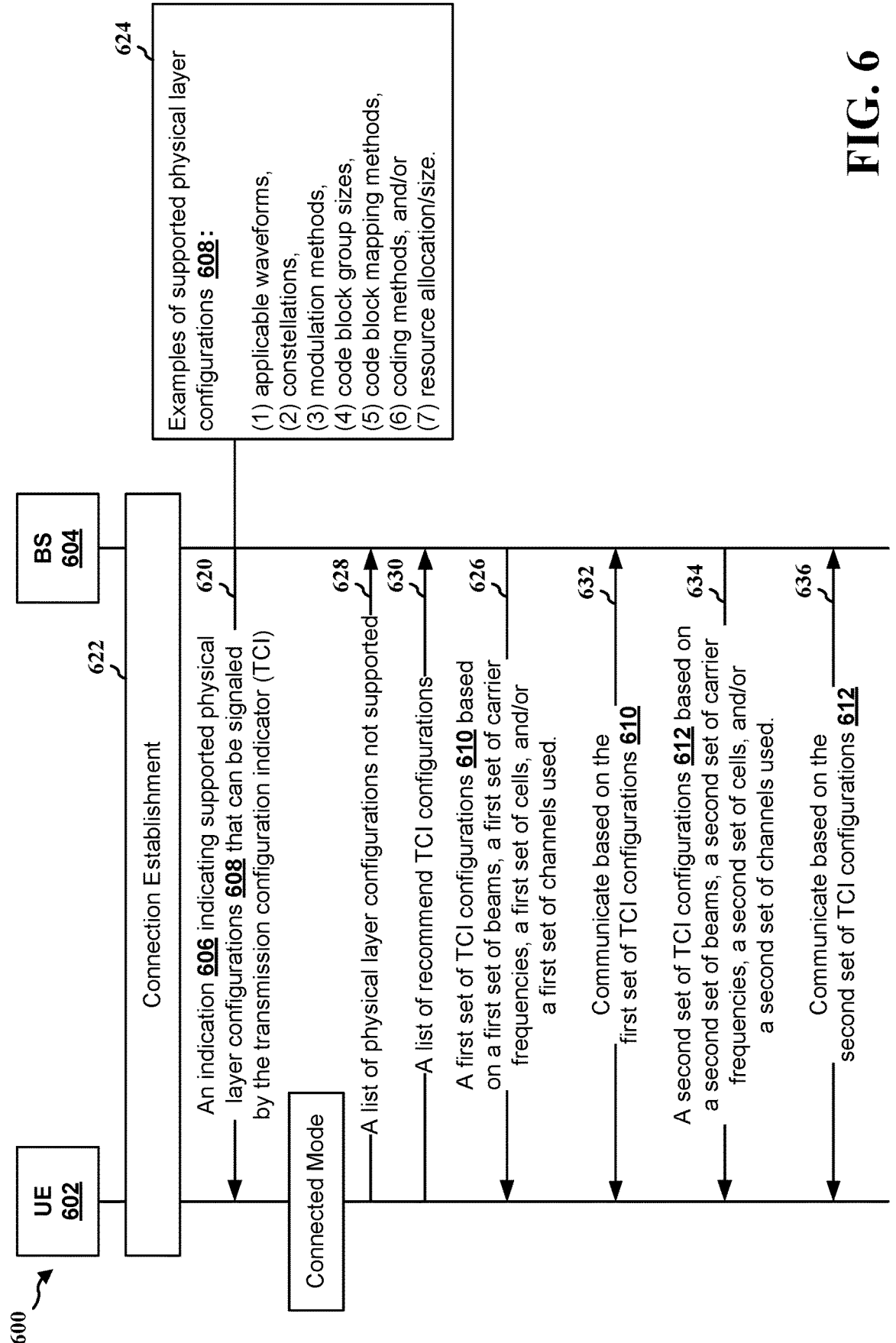
FIG. 6 is a communication flow illustrating an example of a network entity signaling different transmission configuration indicator (TCI) configurations to a UE for a set of beams, carrier frequencies, cells, and/or channels in accordance with various aspects of the present disclosure.

FIG. 6 is a communication flow 600 illustrating an example of a network entity signaling different TCI configurations to a UE for a set of beams, carrier frequencies, cells, and/or channels in accordance with various aspects of the present disclosure. The numberings associated with the communication flow 600 do not specify a particular temporal order and are merely used as references for the communication flow 600. Aspects presented herein may enable the network entity to provide different TCI configurations to the UE based on beams, carrier frequencies, cells, and/or channels used by the UE and/or the network entity, thereby improving the power and spectral efficiency for the wireless communication.

At 620, a base station 604 (e.g., a network entity, the base station 504, etc.) may transmit an indication 606 that indicates a set of supported physical layer configurations 608 that can be signaled by the TCI. In other words, the set of supported physical layer configurations 608 may be associated with a set of TCI configurations, which may also be referred to as physical layer TCI configurations. For purposes of the present disclosure, a set may include at least one element. For example, a set of physical layer configurations may include one physical layer configuration or multiple physical layer configurations. In one example, as shown at 622, the base station 604 may transmit the indication 606 during a connection establishment between the UE 602 and the base station 604 (e.g., when the UE 602 is performing a random-access channel (RACH) procedure).

As shown at 624, the set of supported physical layer configurations 608 may include:

(1) applicable waveform(s), e.g., OFDM waveform, DFT-s-OFDM waveform, SC waveform, CDMA waveform, etc.;

(2) constellation(s), e.g., QAM, non-square QAM, APSK, etc.;

(3) modulation method(s), e.g., multi-level coding, BICM, OOK, etc.;

(4) CBG size(s), e.g., 1 bit, 2 bits, 4 bits, 8 bits, etc.;

(5) CB mapping method(s), e.g., time domain, frequency domain, layer domain, etc.;

(6) coding method(s), e.g., LDPC coding, BCH coding/ multi-level BCH coding. Reed-Solomon coding, turbo coding, etc.; or a combination thereof; and/or (7) resource allocation/size (e.g., one TCI may be configured for a first range of resource allocation size (e.g., between 50-100 resources blocks (RBs)) and another TCI may be configured for a second range of resource allocation size (e.g., between 0-50 RBs), etc.

At 626, after the UE 602 is in a connected mode (e.g., the UE 602 is connected to the base station 604), the base station 604 may transmit a first set of TCI configurations 610 that is specified or configured for a first set of beams, a first set of carrier frequencies, a first set of cells, a first set of channels used, or a combination thereof. For example, as discussed in connection with 534 of FIG. 5, if the UE 602 is communicating with the base station 604 based on a high-frequency band and under a LOS condition, the first set of TCI configurations 610 may configure the UE 602 to use an SC waveform with a specified constellation, modulation method, CBG size, CB mapping method, resource allocation/size, and/or coding method, etc. In one example, the base station 604 may transmit the first set of TCI configurations 610 using a MAC-CE, an RRC message, or DCI.

In some examples, each TCI configuration may correspond or applicable to one or more beams, one or more carrier frequencies, one or more cells, and/or one or more channels. For example, as described in connection with 524 of FIG. 5, if multiple beams are being activated at the same time and the beams have similar channel condition(s) (e.g., under LOS condition), the base station 604 may use one TCI configuration (e.g., a common TCI configuration) to configure the multiple beams, such as configuring the UE 602 to use an SC waveform with a specified constellation, modulation method, CBG size, CB mapping method, resource allocation/size, and/or coding method, etc. when the communication is performed via these multiple beams.

In one aspect, as shown at 628, to enable the base station 604 to provide more accurate TCI configurations for the UE 602 based on beam(s), carrier-frequencies, cell(s), and/or channel(s), the UE 602 may transmit a list of physical layer configurations that are not supported by the UE to the base station 604, such as physical layer configurations not supported by the hardware or capability of the UE 602. For example, if the UE 602 has four antennas, the UE 602 may indicate to the base station 604 that it does not support an operation that specifies using more than four antennas. As such, based on the list of physical layer configurations not supported by the UE 602, the base station 604 may avoid configuring TCI configurations that are incapable of performed by the UE 602. In other words, the base station 604 may transmit the first set of TCI configurations 610 based at last in part on the list of physical layer configurations that are not supported by the UE 602.

In another example, as shown at 630, to assist the base station 604 to provide more accurate/suitable TCI configurations for the UE 602 based on beam(s), carrier-frequencies, cell(s), and/or channel(s), the UE 602 may transmit a list of recommended TCI configurations to the base station 604, such that the UE 602 may receive the first set of TCI configurations 610 from the base station 604 based at least in part on the list of recommended TCI configurations. For example, based on the current power level of the UE 602, the UE 602 may recommend TCI configurations that specify lower power consumption, such as using a lower complexity constellation, modulation method, resource allocation/size, and/or coding method, etc. In one example, the UE 602 may transmit the list of recommended TCI configurations for a specific beam, carrier-frequency, cell, and/or channel via feedback reports. For example, the UE 602 may determine and transmit a set of recommended TCI configurations for a specific beam via a channel state information feedback (CSF) report. To assist a UE in estimating the channel, a base station may transmit one or more reference signals, such as CSI-RS, to the UE. After channel estimation, the UE may return a CSF report indicating the quality of the channel to the base station. This CSF report may include, for example, a channel quality indicator (CQI) that indicates to the base station an MCS to use for transmissions to the UE. The CSF report may further include a rank indicator (RI) that indicates the rank (e.g., the number of data streams) for the base station to utilize for downlink communications to the UE and a precoding matrix indicator (PMI) that indicates the precoding matrix for the base station to utilize for downlink communications to the UE, etc.

At 632, based on the first set of TCI configurations 610, the UE 602 may communicate with the base station 604 (or with another network entity or UE) based on the first set of TCI configurations 610. For example, if the first set of TCI configurations 610 specifies the UE 602 to use a specific waveform, modulation method, and CBG size when communicating via a specified beam (e.g., via a first beam of a first TRP), a specified carrier-frequency (e.g., 800 MHz), a specified cell (e.g., primary cell (PCell), and/or a specified channel (e.g., PUSCH), the UE 602 may communicate with the base station use the specific waveform, modulation method, and CBG size if the communication is based on the specified beam, carrier-frequency, cell, and/or channel.

As channel conditions between the UE 602 and the base station 604 may change over time, such as when the UE 602 moves to a different location, the base station 604 may transmit a different or an updated set of TCI configurations to the UE 602 based on the changes in channel conditions, beam(s), carrier-frequencies, cell(s), and/or channels.

For example, at 634, if the base station 604 detects that the channel conditions between the UE 602 and the base station 604 have changed, the base station 604 may transmit a second set of TCI configurations 612 that is specified or configured for a second set of beams, a second set of carrier frequencies, a second set of cells, a second set of channels used, or a combination thereof. For example, as discussed in connection with 532 of FIG. 5, if the UE 602 is communicating with the base station 604 based on a NLOS condition, the second set of TCI configurations 612 may configure the UE 602 to use an OFDM waveform with a specified constellation, modulation method, CBG size, CB mapping method, resource allocation/size, and/or coding method, etc.

Then, at 636, based on the second set of TCI configurations 612, the UE 602 may communicate with the base station 604 (or with another network entity or UE) based on the second set of TCI configurations 612.

By enabling a TCI configuration to be defined for or associated with one or more beams, one or more carrier frequencies, one or more cells, and/or one or more channels, the base station 604 and the UE 602 may have more flexibility to adjust their physical layer configurations, thereby improving the power and spectral efficiency for the UE 602 and/or the base station 604. For example, when there is a high carrier frequency and a high phase noise, one constellation/modulation/coding method may be preferred/desired over another constellation/modulation/coding method. In another example, to reduce power consumption at the UE 602, the TCI configuration may configure the UE to use multi-level coding as the multi-level coding may take part of the bits in a constellation and encode them and the rest of the bits may not be encoded (e.g., reducing the modulation time). In another example, during a high moving speed scenario, there may be a high Doppler and the channel condition may change rapidly. As such, the UE 602 and/or the base station 604 may determine that a smaller CBG size may be more appropriate for the channel (e.g., it takes lesser time to decode a smaller CBG). As such, a TCI configuration may be used to associate the CBG size to a carrier frequency/beam under the high moving speed scenario.

FIG. 7 is a flowchart 700 of a method of wireless communication. The method may be performed by a UE (e.g., the UE 104, 502, 602; the apparatus 904). The method may enable the UE to be configured by a network entity with various types of physical layer TCI configurations based on beam(s), carrier-frequencies, cells, and/or channels used by the UE for communication.

At 702, the UE may receive, from a network entity, an indication of a set of physical layer configurations that is capable of being signaled by a TCI where the set of physical layer configurations may be associated with a set of TCI configurations, such as described in connection with FIGS.

5 and 6. For example, as shown at 620 of FIG. 6, the UE 602 may receive an indication 606 from the base station 604 that indicates a set of supported physical layer configurations 608 that can be signaled by the TCI. The reception of the indication may be performed by, e.g., the TCI configuration process component 198, the application processor 906, the cellular baseband processor 924, and/or the transceiver(s) 922 of the apparatus 904 in FIG. 9.

In one example, the indication may be received during a connection establishment between the UE and the network entity, and the set of TCI configurations may be received during a connected mode between the UE and the network entity.

In another example, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

At 708, the UE may receive, from the network entity, the set of TCI configurations associated with the set of physical layer configurations based on the indication, where the set of TCI configurations may be associated with a set of beams, a set of carrier frequencies, a set of cells, a set of channels, or a combination thereof, and where each TCI configuration in the set of TCI configurations corresponds to at least one beam in the set of beams, at least one carrier frequency in the set of carrier frequencies, at least one cell in the set of cells, at least one channel in the set of channels, or a combination thereof, such as described in connection with FIGS. 5 and 6. For example, as shown at 626 of FIG. 6, the UE 602 may receive a first set of TCI configurations 610 based on a first set of beams, a first set of carrier frequencies, a first set of cells, and/or a first set of channels used. The reception of the set of TCI configurations may be performed by, e.g., the TCI configuration process component 198, the application processor 906, the cellular baseband processor 924, and/or the transceiver(s) 922 of the apparatus 904 in FIG. 9.

In one example, the set of TCI configurations may include a common configuration that is applicable to a plurality of beams or CCs.

In another example, the set of TCI configurations may be received in a MAC-CE, an RRC message, or DCI.

In another example, at 704, the UE may transmit a list of physical layer configurations that are not supported by the UE to the network entity, where the set of TCI configurations may be received from the network entity further based on the list of physical layer configurations that are not supported by the UE, such as described in connection with FIGS. 5 and 6. For example, as shown at 628 of FIG. 6, the UE 602 may transmit a list of physical layer configurations that are not supported by the UE 602 to the base station, and the UE 602 may receive the first set of TCI configurations 610 based at least in part on the list of physical layer configurations that are not supported by the UE 602. The transmission of the list of physical layer configurations that are not supported by the UE may be performed by, e.g., the TCI configuration process component 198, the application processor 906, the cellular baseband processor 924, and/or the transceiver(s) 922 of the apparatus 904 in FIG. 9.

In another example, at 706, the UE may transmit a list of recommended TCI configurations, where the set of TCI configurations may be received from the network entity further based on the list of recommended TCI configurations, such as described in connection with FIGS. 5 and 6. For example, as shown at 630 of FIG. 6, the UE 602 may transmit a list of recommended TCI configurations to the base station 604, and the UE 602 may receive the first set of TCI configurations 610 based at least in part on the list of recommended TCI configurations. The transmission of the list of recommended TCI configurations may be performed by, e.g., the TCI configuration process component 198, the application processor 906, the cellular baseband processor 924, and/or the transceiver(s) 922 of the apparatus 904 in FIG. 9. In some implementations, the UE may determine the list of recommended TCI configurations based on a specific beam in a CSF report.

In another example, at 710, the UE may communicate with the network entity based on the set of TCI configurations, such as described in connection with FIGS. 5 and 6. For example, as shown at 632 of FIG. 6, the UE 602 may communicate with the base station 604 based on the first set of TCI configurations 610. The communication may be performed by, e.g., the TCI configuration process component 198, the application processor 906, the cellular baseband processor 924, and/or the transceiver(s) 922 of the apparatus 904 in FIG. 9.

In another example, at 712, the UE may receive a second set of TCI configurations from the network entity based on a change in channel conditions, where the second set of TCI configurations may be different from the set of TCI configurations, such as described in connection with FIGS. 5 and 6. For example, as shown at 634 of FIG. 6, the UE 602 may receive a second set of TCI configurations 612 from the base station 604 based on a second set of beams, a second set of carrier frequencies, a second set of cells, and/or a second set of channels used. The reception of the second set of TCI configurations may be performed by, e.g., the TCI configuration process component 198, the application processor 906, the cellular baseband processor 924, and/or the transceiver(s) 922 of the apparatus 904 in FIG. 9.

FIG. 8 is a flowchart 800 of a method of wireless communication. The method may be performed by a UE (e.g., the UE 104, 502, 602; the apparatus 904). The method may enable the UE to be configured by a network entity with various types of physical layer TCI configurations based on beam(s), carrier-frequencies, cells, and/or channels used by the UE for communication.

At 802, the UE may receive, from a network entity, an indication of a set of physical layer configurations that is capable of being signaled by a TCI where the set of physical layer configurations may be associated with a set of TCI configurations, such as described in connection with FIGS. 5 and 6. For example, as shown at 620 of FIG. 6, the UE 602 may receive an indication 606 from the base station 604 that indicates a set of supported physical layer configurations 608 that can be signaled by the TCI. The reception of the indication may be performed by, e.g., the TCI configuration process component 198, the application processor 906, the cellular baseband processor 924, and/or the transceiver(s) 922 of the apparatus 904 in FIG. 9.

In one example, the indication may be received during a connection establishment between the UE and the network entity, and the set of TCI configurations may be received during a connected mode between the UE and the network entity.

In another example, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

At 808, the UE may receive, from the network entity, the set of TCI configurations associated with the set of physical layer configurations based on the indication, where the set of TCI configurations may be associated with a set of beams, a set of carrier frequencies, a set of cells, a set of channels, or a combination thereof, and where each TCI configuration in the set of TCI configurations corresponds to at least one beam in the set of beams, at least one carrier frequency in the set of carrier frequencies, at least one cell in the set of cells, at least one channel in the set of channels, or a combination thereof, such as described in connection with FIGS. 5 and 6. For example, as shown at 626 of FIG. 6, the UE 602 may receive a first set of TCI configurations 610 based on a first set of beams, a first set of carrier frequencies, a first set of cells, and/or a first set of channels used. The reception of the set of TCI configurations may be performed by, e.g., the TCI configuration process component 198, the application processor 906, the cellular baseband processor 924, and/or the transceiver(s) 922 of the apparatus 904 in FIG. 9.

In one example, the set of TCI configurations may include a common configuration that is applicable to a plurality of beams or CCs.

In another example, the set of TCI configurations may be received in a MAC-CE, an RRC message, or DCI.

In another example, the UE may transmit a list of physical layer configurations that are not supported by the UE to the network entity, where the set of TCI configurations may be received from the network entity further based on the list of physical layer configurations that are not supported by the UE, such as described in connection with FIGS. 5 and 6. For example, as shown at 628 of FIG. 6, the UE 602 may transmit a list of physical layer configurations that are not supported by the UE 602 to the base station, and the UE 602 may receive the first set of TCI configurations 610 based at least in part on the list of physical layer configurations that are not supported by the UE 602. The transmission of the list of physical layer configurations that are not supported by the UE may be performed by, e.g., the TCI configuration process component 198, the application processor 906, the cellular baseband processor 924, and/or the transceiver(s) 922 of the apparatus 904 in FIG. 9.

In another example, the UE may transmit a list of recommended TCI configurations, where the set of TCI configurations may be received from the network entity further based on the list of recommended TCI configurations, such as described in connection with FIGS. 5 and 6. For example, as shown at 630 of FIG. 6, the UE 602 may transmit a list of recommended TCI configurations to the base station 604, and the UE 602 may receive the first set of TCI configurations 610 based at least in part on the list of recommended TCI configurations. The transmission of the list of recommended TCI configurations may be performed by, e.g., the TCI configuration process component 198, the application processor 906, the cellular baseband processor 924, and/or the transceiver(s) 922 of the apparatus 904 in FIG. 9. In some implementations, the UE may determine the list of recommended TCI configurations based on a specific beam in a CSF report.

In another example, the UE may communicate with the network entity based on the set of TCI configurations, such as described in connection with FIGS. 5 and 6. For example, as shown at 632 of FIG. 6, the UE 602 may communicate with the base station 604 based on the first set of TCI configurations 610. The communication may be performed by, e.g., the TCI configuration process component 198, the application processor 906, the cellular baseband processor 924, and/or the transceiver(s) 922 of the apparatus 904 in FIG. 9.

In another example, the UE may receive a second set of TCI configurations from the network entity based on a change in channel conditions, where the second set of TCI configurations may be different from the set of TCI configurations, such as described in connection with FIGS. 5 and 6. For example, as shown at 634 of FIG. 6, the UE 602 may receive a second set of TCI configurations 612 from the base station 604 based on a second set of beams, a second set of carrier frequencies, a second set of cells, and/or a second set of channels used. The reception of the second set of TCI configurations may be performed by, e.g., the TCI configuration process component 198, the application processor 906, the cellular baseband processor 924, and/or the transceiver(s) 922 of the apparatus 904 in FIG. 9.

Figure 9:
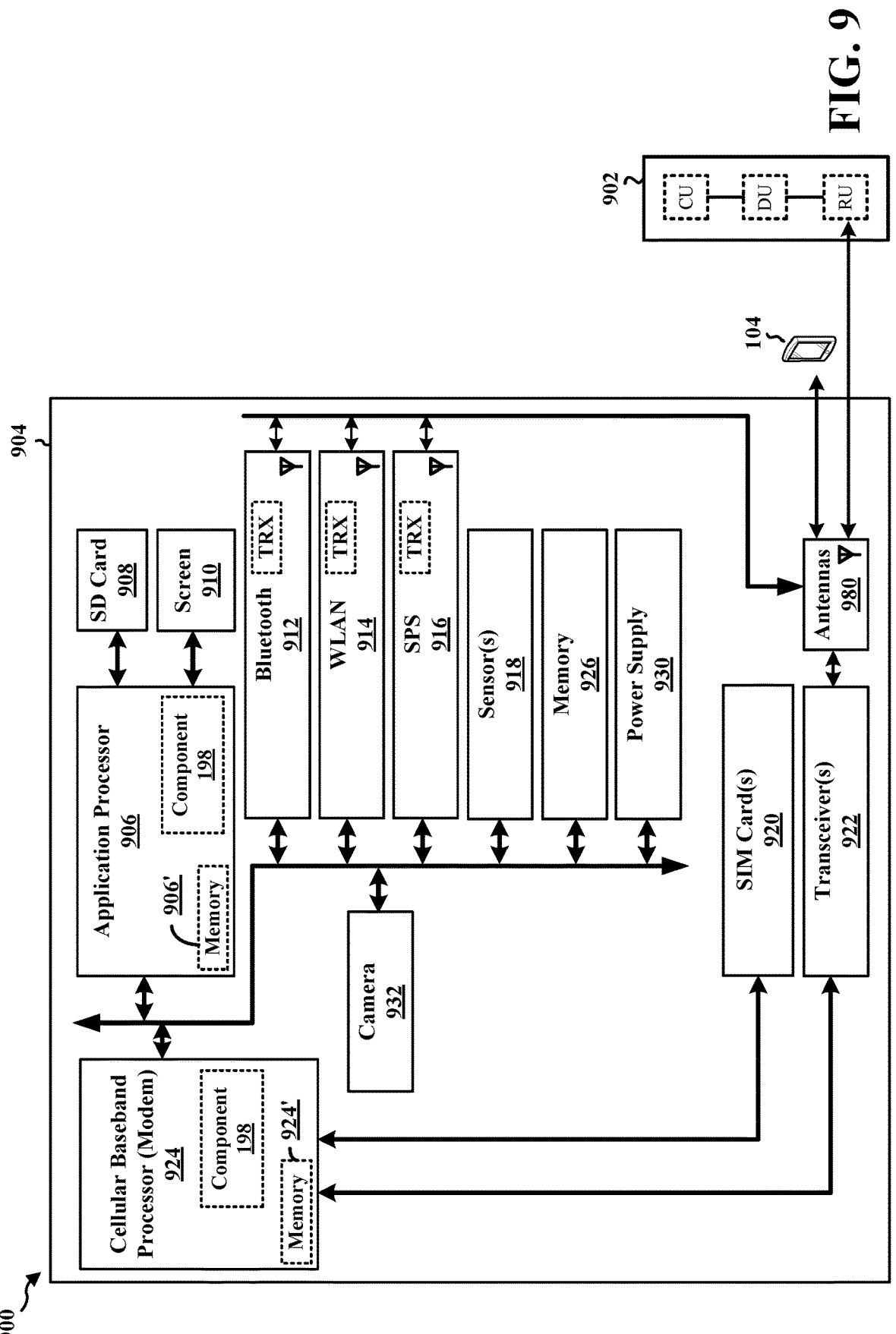
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924',906', respectively. The additional memory modules 926 may also be considered a computer-readable medium/memory. Each computer-readable medium/memory 924',906',926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application)

and include just the cellular baseband processor 924 and/or the application processor 906, and in another configuration, the apparatus 904 may be the entire UE (e.g., see UE 350 of FIG. 3) and include the additional modules of the apparatus 904.

As discussed supra, the TCI configuration process component 198 may be configured to receive, from a network entity, an indication of a set of physical layer configurations that is capable of being signaled by a TCI, where the set of physical layer configurations is associated with a set of TCI configurations. The TCI configuration process component 198 may also be configured to receive, from the network entity, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof. The TCI configuration process component 198 may be within the cellular baseband processor 924, the application processor 906, or both the cellular baseband processor 924 and the application processor 906. The TCI configuration process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, may include means for receiving, from a network entity, an indication of a set of physical layer configurations that is capable of being signaled by a TCI, where the set of physical layer configurations is associated with a set of TCI configurations. The apparatus 904 may further include means for receiving, from the network entity, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

In one configuration, the indication may be received during a connection establishment between the UE and the network entity, and the set of TCI configurations may be received during a connected mode between the UE and the network entity.

In another configuration, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

In another configuration, the set of TCI configurations may include a common configuration that is applicable to a plurality of beams or CCs.

In another configuration, the set of TCI configurations may be received in a MAC-CE, an RRC message, or DCI.

In another configuration, the apparatus 904 may further include means for transmitting a list of physical layer configurations that are not supported by the UE to the network entity, where the set of TCI configurations may be received from the network entity further based on the list of physical layer configurations that are not supported by the UE.

In another configuration, the apparatus 904 may further include means for transmitting a list of recommended TCI configurations, where the set of TCI configurations may be received from the network entity further based on the list of recommended TCI configurations. In some implementations, the apparatus 904 may further include means for determining the list of recommended TCI configurations based on a specific beam in a CSF report.

In another configuration, the apparatus 904 may further include means for communicating with the network entity based on the set of TCI configurations.

In another configuration, the apparatus 904 may further include means for receiving a second set of TCI configurations from the network entity based on a change in channel conditions, where the second set of TCI configurations may be different from the set of TCI configurations.

The means may be the TCI configuration process component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 10 is a flowchart 1000 of a method of wireless communication. The method may be performed by a network entity (e.g., the base station 102, 504, 604; the network entity 902, 1202). The method may enable the network entity to configure a UE with various types of physical layer TCI configurations based on beam(s), carrier-frequencies, cells, and/or channels used by the UE for communication.

At 1002, the network entity may transmit, for a UE, an indication of a set of physical layer configurations that is capable of being signaled by a TCI, where the set of physical layer configurations is associated with a set of TCI configurations, such as described in connection with FIGS. 5 and 6. For example, as shown at 620 of FIG. 6, the base station 604 may transmit an indication 606 to the UE 602 that indicates a set of supported physical layer configurations 608 that can be signaled by the TCI. The transmission of the indication may be performed by, e.g., the physical layer TCI configuration component 199, the RU processor 1242, and/or the transceiver(s) 1246 of the network entity 1202 in FIG. 12.

In one example, the indication may be transmitted during a connection establishment between the UE and the network entity, and the set of TCI configurations may be transmitted during a connected mode between the UE and the network entity.

In another example, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

At 1008, the network entity may transmit, for the UE, the set of TCI configurations associated with the set of physical layer configurations based on the indication, where the set of TCI configurations is associated with a set of beams, a set of carrier frequencies, a set of cells, a set of channels, or a combination thereof, and where each TCI configuration in the set of TCI configurations corresponds to at least one beam in the set of beams, at least one carrier frequency in the set of carrier frequencies, at least one cell in the set of cells, at least one channel in the set of channels, or a combination thereof, such as described in connection with FIGS. 5 and 6. For example, as shown at 626 of FIG. 6, the base station 604 may transmit a first set of TCI configurations 610 to the UE 602 based on a first set of beams, a first set of carrier frequencies, a first set of cells, and/or a first set of channels used. The transmission of the set of TCI configurations may be performed by, e.g., the physical layer TCI configuration component 199, the RU processor 1242, and/or the transceiver(s) 1246 of the network entity 1202 in FIG. 12.

In one example, the set of TCI configurations may include a common configuration that is applicable to a plurality of beams or CCs.

In another example, the set of TCI configurations may be transmitted in a MAC-CE, an RRC message, or DCI.

In another example, the set of TCI configurations may be broadcasted to a plurality of UEs that are served by a same beam.

In another example, at 1004, the network entity may receive a list of physical layer configurations that are not supported by the UE from the UE, where the set of TCI configurations is transmitted to the UE further based on the list of physical layer configurations that are not supported by the UE, such as described in connection with FIGS. 5 and 6. For example, as shown at 628 of FIG. 6, the base station 604 may receive a list of physical layer configurations that are not supported by the UE 602 from the UE 602, and the base station 604 may transmit the first set of TCI configurations 610 to the UE 602 based at least in part on the list of physical layer configurations that are not supported by the UE 602. The reception of the list of physical layer configurations that are not supported by the UE may be performed by, e.g., the physical layer TCI configuration component 199, the RU processor 1242, and/or the transceiver(s) 1246 of the network entity 1202 in FIG. 12.

In another example, at 1006, the network entity may receive a list of recommended TCI configurations, where the set of TCI configurations is transmitted to the UE further based on the list of recommended TCI configurations, such as described in connection with FIGS. 5 and 6. For example, as shown at 630 of FIG. 6, the base station 604 may receive a list of recommended TCI configurations from the UE 602, and the base station 604 may transmit the first set of TCI configurations 610 to the UE 602 based at least in part on the list of recommended TCI configurations. The reception of the list of recommended TCI configurations may be performed by, e.g., the physical layer TCI configuration component 199, the RU processor 1242, and/or the transceiver(s) 1246 of the network entity 1202 in FIG. 12. In some implementations, the list of recommended TCI configurations may be based on a specific beam in a CSF report.

In another example, at 1010, the network entity may communicate with the UE based on the set of TCI configurations, such as described in connection with FIGS. 5 and 6. For example, as shown at 632 of FIG. 6, the base station 604 may communicate with the UE 602 based on the first set of TCI configurations 610. The communication may be performed by, e.g., the physical layer TCI configuration component 199, the RU processor 1242, and/or the transceiver(s) 1246 of the network entity 1202 in FIG. 12.

In another example, at 1012, the network entity may transmit a second set of TCI configurations to the UE based on a change in channel conditions, where the second set of TCI configurations may be different from the set of TCI configurations, such as described in connection with FIGS. 5 and 6. For example, as shown at 634 of FIG. 6, the base station 604 may transmit a second set of TCI configurations 612 to the UE 602 based on a second set of beams, a second set of carrier frequencies, a second set of cells, and/or a second set of channels used. The transmission of the second set of TCI configurations may be performed by, e.g., the physical layer TCI configuration component 199, the RU processor 1242, and/or the transceiver(s) 1246 of the network entity 1202 in FIG. 12.

FIG. 11 is a flowchart 1100 of a method of wireless communication. The method may be performed by a network entity (e.g., the base station 102, 504, 604; the network entity 902, 1202). The method may enable the network entity to configure a UE with various types of physical layer TCI configurations based on beam(s), carrier-frequencies, cells, and/or channels used by the UE for communication.

At 1102, the network entity may transmit, for a UE, an indication of a set of physical layer configurations that is capable of being signaled by a TCI, where the set of physical layer configurations is associated with a set of TCI configurations, such as described in connection with FIGS. 5 and 6. For example, as shown at 620 of FIG. 6, the base station 604 may transmit an indication 606 to the UE 602 that indicates a set of supported physical layer configurations 608 that can be signaled by the TCI. The transmission of the indication may be performed by, e.g., the physical layer TCI configuration component 199, the RU processor 1242, and/or the transceiver(s) 1246 of the network entity 1202 in FIG. 12.

In one example, the indication may be transmitted during a connection establishment between the UE and the network entity, and the set of TCI configurations may be transmitted during a connected mode between the UE and the network entity.

In another example, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

At 1108, the network entity may transmit, for the UE, the set of TCI configurations associated with the set of physical layer configurations based on the indication, where the set of TCI configurations is associated with a set of beams, a set of carrier frequencies, a set of cells, a set of channels, or a combination thereof, and where each TCI configuration in the set of TCI configurations corresponds to at least one beam in the set of beams, at least one carrier frequency in the set of carrier frequencies, at least one cell in the set of cells, at least one channel in the set of channels, or a combination thereof, such as described in connection with FIGS. 5 and 6. For example, as shown at 626 of FIG. 6, the base station 604 may transmit a first set of TCI configurations 610 to the UE 602 based on a first set of beams, a first set of carrier frequencies, a first set of cells, and/or a first set of channels used. The transmission of the set of TCI configurations may be performed by, e.g., the physical layer TCI configuration component 199, the RU processor 1242, and/or the transceiver(s) 1246 of the network entity 1202 in FIG. 12.

In one example, the set of TCI configurations may include a common configuration that is applicable to a plurality of beams or CCs.

In another example, the set of TCI configurations may be transmitted in a MAC-CE, an RRC message, or DCI.

In another example, the set of TCI configurations may be broadcasted to a plurality of UEs that are served by a same beam.

In another example, the network entity may receive a list of physical layer configurations that are not supported by the UE from the UE, where the set of TCI configurations is transmitted to the UE further based on the list of physical layer configurations that are not supported by the UE, such as described in connection with FIGS. 5 and 6. For example, as shown at 628 of FIG. 6, the base station 604 may receive a list of physical layer configurations that are not supported by the UE 602 from the UE 602, and the base station 604 may transmit the first set of TCI configurations 610 to the UE 602 based at least in part on the list of physical layer configurations that are not supported by the UE 602. The reception of the list of physical layer configurations that are not supported by the UE may be performed by, e.g., the physical layer TCI configuration component 199, the RU processor 1242, and/or the transceiver(s) 1246 of the network entity 1202 in FIG. 12.

In another example, the network entity may receive a list of recommended TCI configurations, where the set of TCI configurations is transmitted to the UE further based on the list of recommended TCI configurations, such as described in connection with FIGS. 5 and 6. For example, as shown at 630 of FIG. 6, the base station 604 may receive a list of recommended TCI configurations from the UE 602, and the base station 604 may transmit the first set of TCI configurations 610 to the UE 602 based at least in part on the list of recommended TCI configurations. The reception of the list of recommended TCI configurations may be performed by, e.g., the physical layer TCI configuration component 199, the RU processor 1242, and/or the transceiver(s) 1246 of the network entity 1202 in FIG. 12. In some implementations, the list of recommended TCI configurations may be based on a specific beam in a CSF report.

In another example, the network entity may communicate with the UE based on the set of TCI configurations, such as described in connection with FIGS. 5 and 6. For example, as shown at 632 of FIG. 6, the base station 604 may communicate with the UE 602 based on the first set of TCI configurations 610. The communication may be performed by, e.g., the physical layer TCI configuration component 199, the RU processor 1242, and/or the transceiver(s) 1246 of the network entity 1202 in FIG. 12.

In another example, the network entity may transmit a second set of TCI configurations to the UE based on a change in channel conditions, where the second set of TCI configurations may be different from the set of TCI configurations, such as described in connection with FIGS. 5 and 6. For example, as shown at 634 of FIG. 6, the base station 604 may transmit a second set of TCI configurations 612 to the UE 602 based on a second set of beams, a second set of carrier frequencies, a second set of cells, and/or a second set of channels used. The transmission of the second set of TCI configurations may be performed by, e.g., the physical layer TCI configuration component 199, the RU processor 1242, and/or the transceiver(s) 1246 of the network entity 1202 in FIG. 12.

Figure 12:
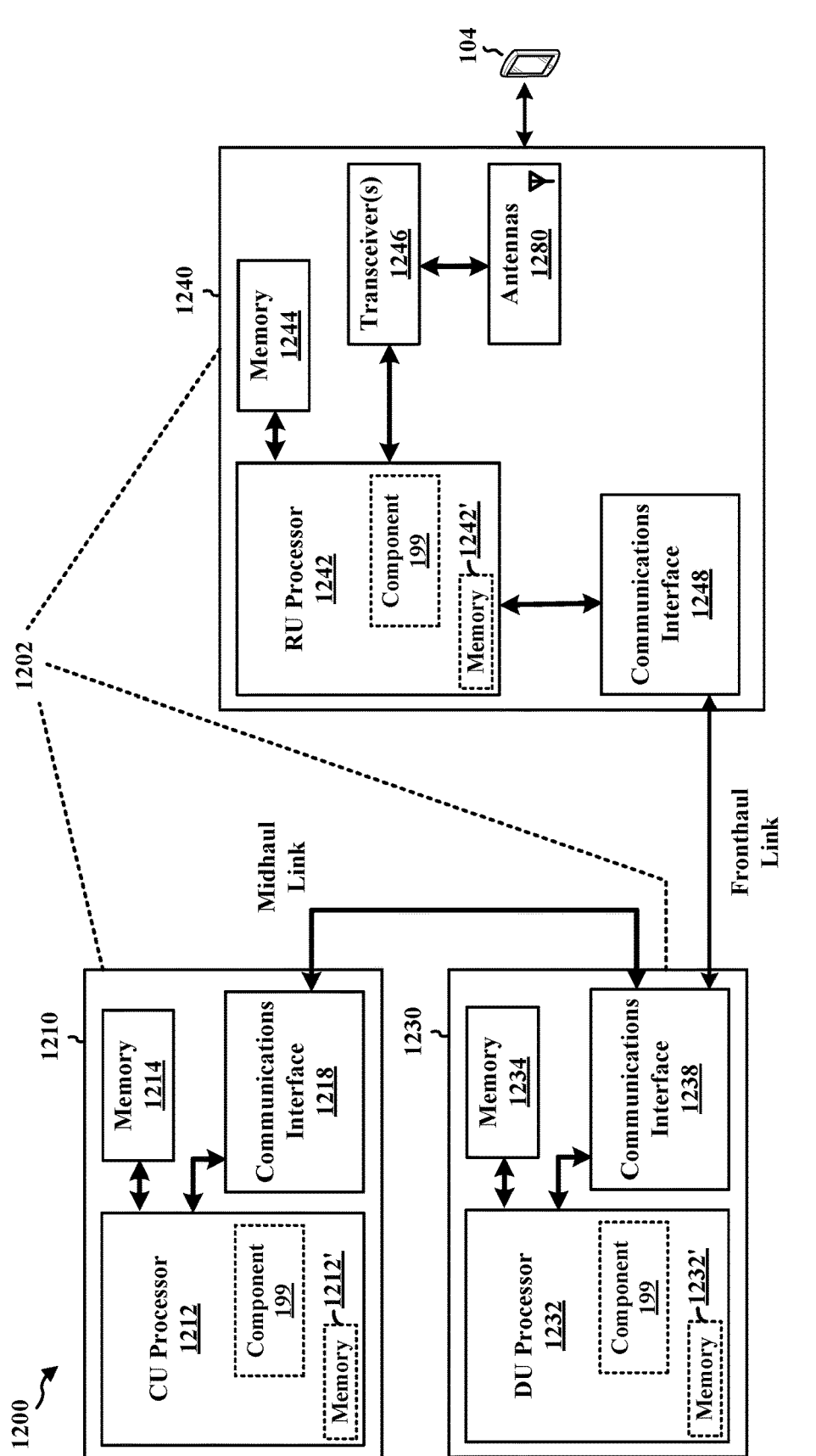
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the physical layer TCI configuration component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the physical layer TCI configuration component 199 may be configured to transmit, for a UE, an indication of a set of physical layer configurations that is capable of being signaled by a TCI, where the set of physical layer configurations is associated with a set of TCI configurations. The physical layer TCI configuration component 199 may also be configured to transmit, for the UE, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof. The physical layer TCI configuration component 199 may be within one or more processors of one or more of the CU 1210, DU 1230, and the RU 1240. The physical layer TCI configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for transmitting, for a UE, an indication of a set of physical layer configurations that is capable of being signaled by a TCI, where the set of physical layer configurations is associated with a set of TCI configurations. The network entity 1202 may further include means for transmitting, for the UE, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

In one configuration, the indication may be transmitted during a connection establishment between the UE and the network entity, and the set of TCI configurations may be transmitted during a connected mode between the UE and the network entity.

In another configuration, the set of physical layer configurations may include: one or more applicable waveforms, one or more constellations, one or more modulation methods, one or more code block group sizes, one or more CB mapping methods, one or more coding methods, one or more resource allocations or sizes, or a combination thereof.

In another configuration, the set of TCI configurations may include a common configuration that is applicable to a plurality of beams or CCs.

In another configuration, the set of TCI configurations may be transmitted in a MAC-CE, an RRC message, or DCI.

In another configuration, the set of TCI configurations may be broadcasted to a plurality of UEs that are served by a same beam.

In another configuration, the network entity 1202 may further include means for receiving a list of physical layer configurations that are not supported by the UE from the UE, where the set of TCI configurations is transmitted to the UE further based on the list of physical layer configurations that are not supported by the UE.

In another configuration, the network entity 1202 may further include means for receiving a list of recommended TCI configurations, where the set of TCI configurations is transmitted to the UE further based on the list of recommended TCI configurations. In some implementations, the list of recommended TCI configurations may be based on a specific beam in a CSF report.

In another configuration, the network entity 1202 may further include means for communicating with the UE based on the set of TCI configurations.

In another configuration, the network entity 1202 may further include means for transmitting a second set of TCI configurations to the UE based on a change in channel conditions, where the second set of TCI configurations may be different from the set of TCI configurations.

The means may be the physical layer TCI configuration component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving, from a network entity, an indication of a set of physical layer configurations that is capable of being signaled by a TCI, where the set of physical layer configurations is associated with a set of TCI configurations; and receiving, from the network entity, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

Aspect 2 is the method of aspect 1, where the indication is received during a connection establishment between the UE and the network entity, and the set of TCI configurations is received during a connected mode between the UE and the network entity.

Aspect 3 is the method of aspect 1 or 2, where the set of physical layer configurations includes: one or more applicable waveforms, one or more constellations, one or more modulation methods, one or more code block group sizes, one or more CB mapping methods, one or more coding methods, one or more resource allocations or sizes, or a combination thereof.

Aspect 4 is the method of any of aspects 1 to 3, further including: transmitting a list of physical layer configurations that are not supported by the UE to the network entity, where the set of TCI configurations is received from the network entity further based on the list of physical layer configurations that are not supported by the UE.

Aspect 5 is the method of any of aspects 1 to 4, where the set of TCI configurations includes a common configuration that is applicable to a plurality of beams or CCs.

Aspect 6 is the method of any of aspects 1 to 5, further including: transmitting a list of recommended TCI configurations, where the set of TCI configurations is received from the network entity further based on the list of recommended TCI configurations.

Aspect 7 is the method of aspect 6, further including: determining the list of recommended TCI configurations based on a specific beam in a CSF report.

Aspect 8 is the method of any of aspects 1 to 7, further including: receiving a second set of TCI configurations from the network entity based on a change in channel conditions, where the second set of TCI configurations is different from the set of TCI configurations.

Aspect 9 is the method of any of aspects 1 to 8, where the set of TCI configurations is received in a MAC-CE, an RRC message, or DCI.

Aspect 10 is the method of any of aspects 1 to 9, further including: communicating with the network entity based on the set of TCI configurations.

Aspect 11 is an apparatus for wireless communication at a UE, including: a memory; and at least one processor coupled to the memory and, based at least in part on information stored in the memory, the at least one processor is configured to implement any of aspects 1 to 10.

Aspect 12 is the apparatus of aspect 11, further including at least one of a transceiver or an antenna coupled to the at least one processor.

Aspect 13 is an apparatus for wireless communication including means for implementing any of aspects 1 to 10.

Aspect 14 is a computer-readable medium (e.g., a non-transitory computer-readable medium) storing computer executable code, where the code when executed by a processor causes the processor to implement any of aspects 1 to 10.

Aspect 15 is a method of wireless communication at a network entity, including: transmitting, for a UE, an indication of a set of physical layer configurations that is capable of being signaled by a TCI, where the set of physical layer configurations is associated with a set of TCI configurations; and transmitting, for the UE, the set of TCI configurations associated with the set of physical layer configurations based on the indication, where the set of TCI configurations is associated with a set of beams, a set of carrier frequencies, a set of cells, a set of channels, or a combination thereof, where each TCI configuration in the set of TCI configurations corresponds to at least one beam in the set of beams, at least one carrier frequency in the set of carrier frequencies, at least one cell in the set of cells, at least one channel in the set of channels, or a combination thereof.

Aspect 16 is the method of aspect 15, where the indication is transmitted during a connection establishment between the UE and the network entity, and the set of TCI configurations is transmitted during a connected mode between the UE and the network entity.

Aspect 17 is the method of aspect 15 or 16, where the set of physical layer configurations includes: one or more applicable waveforms, one or more constellations, one or more modulation methods, one or more code block group sizes, one or more CB mapping methods, one or more coding methods, one or more resource allocations or sizes, or a combination thereof.

Aspect 18 is the method of any of aspects 15 to 17, further including: receiving a list of physical layer configurations that are not supported by the UE from the UE, where the set of TCI configurations is transmitted to the UE further based on the list of physical layer configurations that are not supported by the UE.

Aspect 19 is the method of any of aspects 15 to 18, where the set of TCI configurations includes a common configuration that is applicable to a plurality of beams or CCs.

Aspect 20 is the method of any of aspects 15 to 19, further including: receiving a list of recommended TCI configurations, where the set of TCI configurations is transmitted to the UE further based on the list of recommended TCI configurations.

Aspect 21 is the method of aspect 20, where the list of recommended TCI configurations is based on a specific beam in a CSF report.

Aspect 22 is the method of any of aspects 15 to 21, further including: transmitting a second set of TCI configurations to the UE based on a change in channel conditions, where the second set of TCI configurations is different from the set of TCI configurations.

Aspect 23 is the method of any of aspects 15 to 22, where the set of TCI configurations is transmitted in a MAC-CE, an RRC message, or DCI.

Aspect 24 is the method of any of aspects 15 to 23, where the set of TCI configurations are broadcasted to a plurality of UEs that are served by a same beam.

Aspect 25 is the method of any of aspects 15 to 24, further including: communicating with the UE based on the set of TCI configurations.

Aspect 26 is an apparatus for wireless communication at a network entity, including: a memory; and at least one processor coupled to the memory and, based at least in part on information stored in the memory, the at least one processor is configured to implement any of aspects 15 to 25.

Aspect 27 is the apparatus of aspect 26, further including at least one of a transceiver or an antenna coupled to the at least one processor.

Aspect 28 is an apparatus for wireless communication including means for implementing any of aspects 15 to 25.

Aspect 29 is a computer-readable medium (e.g., a non-transitory computer-readable medium) storing computer executable code, where the code when executed by a processor causes the processor to implement any of aspects 15 to 25.

What is claimed is:

1. An apparatus for wireless communication at a user equipment (UE), comprising:

at least one memory; and at least one processor coupled to the at least one memory and, based at least in part on second information stored in the at least one memory, the at least one processor is configured to:

receive, from a network entity, an indication of a set of physical layer configurations that is capable of being signaled by a transmission configuration indicator (TCI), wherein the set of physical layer configurations is associated with a set of TCI configurations;

transmit a list of recommended TCI configurations and a list of physical layer configurations that are not supported by the UE, wherein the list of recommended TCI configurations is based on a specific beam and is in a channel state feedback (CSF) report; and receive, from the network entity, the set of TCI configurations associated with the set of physical layer configurations based on the indication, wherein the set of TCI configurations is received based on the list of recommended TCI configurations and the list of physical layer configurations that are not supported by the UE, wherein the set of TCI configurations is associated with a set of beams, a set of carrier frequencies, a set of cells, a set of channels, or a combination thereof, wherein each TCI configuration in the set of TCI configurations corresponds to at least one beam in the set of beams, at least one carrier frequency in the set of carrier frequencies, at least one cell in the set of cells, at least one channel in the set of channels, or a combination thereof.

2. The apparatus of claim 1, wherein to receive the indication, the at least one processor is configured to receive the indication during a connection establishment between the UE and the network entity, and wherein the at least one processor is configured to receive the set of TCI configurations during a connected mode between the UE and the network entity.

3. The apparatus of claim 1, wherein the set of physical layer configurations includes:

one or more applicable waveforms, one or more constellations, one or more modulation methods, one or more code block group sizes, one or more code block (CB) mapping methods, one or more coding methods, one or more resource allocations or sizes, or a combination thereof.

4. The apparatus of claim 1, wherein the set of TCI configurations includes a common configuration that is applicable to a plurality of beams or component carriers (CCs).

5. The apparatus of claim 1, wherein the at least one processor is further configured to:

receive a second set of TCI configurations from the network entity based on a change in channel conditions, wherein the second set of TCI configurations is different from the set of TCI configurations.

6. The apparatus of claim 1, wherein to receive the set of TCI configurations, the at least one processor is configured to receive the set of TCI configurations in a medium access control (MAC)-control element (CE) (MAC-CE), a radio resource control (RRC) message, or downlink control information (DCI).

7. The apparatus of claim 1, wherein the at least one processor is further configured to:

communicate with the network entity based on the set of TCI configurations.

8. The apparatus of claim 1, wherein the list of physical layer configurations that are not supported by the UE corresponds to the list of physical layer configurations that are not supported by hardware of the UE.

9. A method of wireless communication at a user equipment (UE), comprising:

receiving, from a network entity, an indication of a set of physical layer configurations that is capable of being signaled by a transmission configuration indicator (TCI), wherein the set of physical layer configurations is associated with a set of TCI configurations;

transmitting a list of recommended TCI configurations and a list of physical layer configurations that are not supported by the UE, wherein the list of recommended TCI configurations is based on a specific beam and is in a channel state feedback (CSF) report; and receiving, from the network entity, the set of TCI configurations associated with the set of physical layer configurations based on the indication, wherein the set of TCI configurations is received based on the list of recommended TCI configurations and the list of physical layer configurations that are not supported by the UE, wherein the set of TCI configurations is associated with a set of beams, a set of carrier frequencies, a set of cells, a set of channels, or a combination thereof, wherein each TCI configuration in the set of TCI configurations corresponds to at least one beam in the set of beams, at least one carrier frequency in the set of carrier frequencies, at least one cell in the set of cells, at least one channel in the set of channels, or a combination thereof.

10. The method of claim 9, wherein the set of physical layer configurations includes:

one or more applicable waveforms, one or more constellations, one or more modulation methods, one or more code block group sizes, one or more code block (CB) mapping methods, one or more coding methods, one or more resource allocations or sizes, or a combination thereof.

11. The method of claim 9, further comprising:

receiving a second set of TCI configurations from the network entity based on a change in channel conditions, wherein the second set of TCI configurations is different from the set of TCI configurations.

12. The method of claim 9, wherein the list of physical layer configurations that are not supported by the UE corresponds to the list of physical layer configurations that are not supported by hardware of the UE.

13. An apparatus for wireless communication at a network entity, comprising:

at least one memory; and at least one processor coupled to the at least one memory and, based at least in part on second information stored in the at least one memory, the at least one processor is configured to:

transmit, for a user equipment (UE), an indication of a set of physical layer configurations that is capable of being signaled by a transmission configuration indicator (TCI), wherein the set of physical layer configurations is associated with a set of TCI configurations;

receive a list of recommended TCI configurations and a list of physical layer configurations that are not supported by the UE, wherein the list of recommended TCI configurations is based on a specific beam and is in a channel state feedback (CSF) report; and transmit, for the UE, the set of TCI configurations associated with the set of physical layer configurations based on the indication, wherein the set of TCI configurations is transmitted based on the list of recommended TCI configurations and the list of physical layer configurations that are not supported by the UE, wherein the set of TCI configurations is associated with a set of beams, a set of carrier frequencies, a set of cells, a set of channels, or a combination thereof, wherein each TCI configuration in the set of TCI configurations corresponds to at least one beam in the set of beams, at least one carrier frequency in the set of carrier frequencies, at least one cell in the set of cells, at least one channel in the set of channels, or a combination thereof.

14. The apparatus of claim 13, wherein the at least one processor is configured to transmit the indication during a connection establishment between the UE and the network entity, and wherein the at least one processor is configured to transmit the set of TCI configurations during a connected mode between the UE and the network entity.

15. The apparatus of claim 13, wherein the set of physical layer configurations includes:

one or more applicable waveforms, one or more constellations, one or more modulation methods, one or more code block group sizes, one or more code block (CB) mapping methods, one or more coding methods, one or more resource allocations or sizes, or a combination thereof.

16. The apparatus of claim 13, wherein the set of TCI configurations includes a common configuration that is applicable to a plurality of beams or component carriers (CCs).

17. The apparatus of claim 13, wherein the at least one processor is further configured to:

transmit a second set of TCI configurations to the UE based on a change in channel conditions, wherein the second set of TCI configurations is different from the set of TCI configurations.

18. The apparatus of claim 13, wherein to transmit the set of TCI configurations, the at least one processor is configured to transmit the set of TCI configurations in a medium access control (MAC)-control element (CE) (MAC-CE), a radio resource control (RRC) message, or downlink control information (DCI).

19. The apparatus of claim 13, wherein to transmit the set of TCI configurations, the at least one processor is configured to broadcast the set of TCI configurations to a plurality of UEs that are served by a same beam.

20. The apparatus of claim 13, wherein the at least one processor is further configured to:

communicate with the UE based on the set of TCI configurations.

21. The apparatus of claim 13, wherein the list of physical layer configurations that are not supported by the UE corresponds to the list of physical layer configurations that are not supported by hardware of the UE.

22. A method of wireless communication at a network entity, comprising:

transmitting, for a user equipment (UE), an indication of a set of physical layer configurations that is capable of being signaled by a transmission configuration indicator (TCI), wherein the set of physical layer configurations is associated with a set of TCI configurations;

receiving a list of recommended TCI configurations and a list of physical layer configurations that are not supported by the UE, wherein the list of recommended TCI configurations is based on a specific beam and is in a channel state feedback (CSF) report; and transmitting, for the UE, the set of TCI configurations associated with the set of physical layer configurations based on the indication, wherein the set of TCI configurations is transmitted based on the list of recommended TCI configurations and the list of physical layer configurations that are not supported by the UE, wherein the set of TCI configurations is associated with a set of beams, a set of carrier frequencies, a set of cells, a set of channels, or a combination thereof, wherein each TCI configuration in the set of TCI configurations corresponds to at least one beam in the set of beams, at least one carrier frequency in the set of carrier frequencies, at least one cell in the set of cells, at least one channel in the set of channels, or a combination thereof.

23. The method of claim 22, further comprising:

transmitting a second set of TCI configurations to the UE based on a change in channel conditions, wherein the second set of TCI configurations is different from the set of TCI configurations.

24. The method of claim 22, wherein the list of physical layer configurations that are not supported by the UE corresponds to the list of physical layer configurations that are not supported by hardware of the UE.

* * * * *